US008751384B2

(12) United States Patent
Myklebust et al.

(10) Patent No.: US 8,751,384 B2
(45) Date of Patent: Jun. 10, 2014

(54) INTEGRATED BILL PRESENTMENT AND PAYMENT SYSTEM AND METHOD OF OPERATING THE SAME

(75) Inventors: Hans E. Myklebust, Menomonee Falls, WI (US); Dushyant Sharma, Richmond Hill (CA); Timothy J. Patneaude, Milwaukee, WI (US); Michael J. Kaminski, Milwaukee, WI (US); John L. Watry, Elm Grove, WI (US); Murali Chirala, Morgan Hill, CA (US); Shankar Srinivasan, Saratoga, CA (US)

(73) Assignee: Metavante Corporation, Jacksonville, FL (US)

( * ) Notice: Subject to any disclaimer, the term of this patent is extended or adjusted under 35 U.S.C. 154(b) by 2158 days.

(21) Appl. No.: 10/141,146

(22) Filed: May 8, 2002

(65) Prior Publication Data
US 2005/0010523 A1 Jan. 13, 2005

(51) Int. Cl.
G06Q 40/00 (2012.01)
(52) U.S. Cl.
USPC .......................................................... 705/40
(58) Field of Classification Search
USPC ................................................ 705/26, 40, 35
See application file for complete search history.

(56) References Cited

U.S. PATENT DOCUMENTS

| 3,833,885 | A | 9/1974 | Gentile et al. |
|---|---|---|---|
| 4,277,837 | A | 7/1981 | Stuckert |
| 4,315,101 | A | 2/1982 | Atalla |
| 4,317,957 | A | 3/1982 | Sendrow |
| 4,319,336 | A | 3/1982 | Anderson et al. |
| 4,420,751 | A | 12/1983 | Paganini et al. |
| 4,454,414 | A | 6/1984 | Benton |
| 4,460,960 | A | 7/1984 | Anderson et al. |
| 4,634,845 | A | 1/1987 | Hale et al. |
| 4,678,895 | A | 7/1987 | Tateisi et al. |
| 4,689,478 | A | 8/1987 | Hale et al. |

(Continued)

FOREIGN PATENT DOCUMENTS

| CA | 2329348 | 11/1999 |
|---|---|---|
| CA | 2306123 | 10/2000 |

(Continued)

OTHER PUBLICATIONS

Richard K. Crone, American Banker, vol. 165, Iss. 94, p. 120 "Comment: Banks Should Help Billers Employ Screen Scraping" May 16, 2000.*

(Continued)

*Primary Examiner* — Thomas M Hammond, III
(74) *Attorney, Agent, or Firm* — Finnegan, Henderson, Farabow, Garrett & Dunner, LLP

(57) ABSTRACT

An integrated bill presentment and payment system and an associated method are disclosed which can accomplish the entire process of bill presentment and payment directly with billers, customers, and their respective financial institutions, but which are also capable of interfacing with independent biller service providers, independent customer service providers, independent consolidators, and/or independent payment providers. The integrated bill presentment and payment system and method of the present invention can link directly to billers and customers, and can also access and distribute billing information from third party biller service providers or consolidators and participate in the distribution of the billing information to customers through third party customer service providers and consolidators. The integrated bill presentment and payment system and method of the present invention can make payments on behalf of customers itself, and can also forward payment instructions to third party payment providers if required.

54 Claims, 11 Drawing Sheets

(56) References Cited

U.S. PATENT DOCUMENTS

| | | | |
|---|---|---|---|
| 4,695,880 A | 9/1987 | Johnson et al. | |
| 4,727,243 A | 2/1988 | Savar | |
| 4,734,858 A | 3/1988 | Schlafly | |
| 4,799,156 A | 1/1989 | Shavit et al. | |
| 4,823,264 A | 4/1989 | Deming | |
| 4,947,028 A | 8/1990 | Gorog | |
| 5,007,084 A | 4/1991 | Materna et al. | |
| 5,025,373 A | 6/1991 | Keyser, Jr. et al. | |
| 5,220,501 A | 6/1993 | Lawlor et al. | |
| 5,231,571 A | 7/1993 | D'Agostino | |
| 5,265,033 A | 11/1993 | Vajk et al. | |
| 5,283,829 A | 2/1994 | Anderson | |
| 5,287,270 A | 2/1994 | Hardy et al. | |
| 5,325,290 A | 6/1994 | Cauffman et al. | |
| 5,326,959 A | 7/1994 | Perazza | |
| 5,336,870 A | 8/1994 | Hughes et al. | |
| 5,341,429 A | 8/1994 | Stringer et al. | |
| 5,347,632 A | 9/1994 | Filepp et al. | |
| 5,383,113 A | 1/1995 | Kight et al. | |
| 5,420,405 A | 5/1995 | Chasek | |
| 5,424,938 A | 6/1995 | Wagner et al. | |
| 5,465,206 A * | 11/1995 | Hilt et al. | 705/40 |
| 5,473,143 A | 12/1995 | Vak et al. | |
| 5,483,445 A | 1/1996 | Pickering | |
| 5,579,407 A * | 11/1996 | Murez | 382/164 |
| 5,594,910 A | 1/1997 | Filepp et al. | |
| 5,649,117 A | 7/1997 | Landry | |
| 5,655,089 A | 8/1997 | Bucci | |
| 5,699,528 A | 12/1997 | Hogan | |
| 5,710,889 A | 1/1998 | Clark et al. | |
| 5,717,868 A | 2/1998 | James | |
| 5,727,249 A | 3/1998 | Pollin | |
| 5,729,693 A | 3/1998 | Holda-Fleck | |
| 5,745,886 A | 4/1998 | Rosen | |
| 5,787,403 A | 7/1998 | Randle | |
| 5,815,665 A | 9/1998 | Teper et al. | |
| 5,832,460 A * | 11/1998 | Bednar et al. | 705/27 |
| 5,845,267 A | 12/1998 | Ronen | |
| 5,848,400 A | 12/1998 | Chang | |
| 5,870,724 A | 2/1999 | Lawlor et al. | |
| 5,873,072 A | 2/1999 | Kight et al. | |
| 5,884,288 A | 3/1999 | Chang et al. | |
| 5,884,290 A | 3/1999 | Smorodinsky et al. | |
| 5,890,140 A | 3/1999 | Clark et al. | |
| 5,903,721 A | 5/1999 | Sixtus | |
| 5,903,732 A | 5/1999 | Reed et al. | |
| 5,905,976 A | 5/1999 | Mjolsnes et al. | |
| 5,920,847 A | 7/1999 | Kolling et al. | |
| 5,930,759 A | 7/1999 | Moore et al. | |
| 5,933,816 A * | 8/1999 | Zeanah et al. | 705/35 |
| 5,943,656 A | 8/1999 | Crooks et al. | |
| 5,956,695 A | 9/1999 | Carrithers et al. | |
| 5,956,700 A | 9/1999 | Landry | |
| 5,963,925 A | 10/1999 | Kolling et al. | |
| 5,974,146 A | 10/1999 | Randle et al. | |
| 5,978,780 A | 11/1999 | Watson | |
| 6,029,151 A | 2/2000 | Nikander | |
| 6,032,133 A | 2/2000 | Hilt et al. | |
| 6,044,362 A | 3/2000 | Neely | |
| 6,049,786 A | 4/2000 | Smorodinsky | |
| 6,052,457 A | 4/2000 | Abdelaal et al. | |
| 6,055,567 A | 4/2000 | Ganesan et al. | |
| 6,058,380 A | 5/2000 | Anderson et al. | |
| 6,065,012 A | 5/2000 | Balsara et al. | |
| 6,070,150 A | 5/2000 | Remington et al. | |
| 6,072,870 A | 6/2000 | Nguyen et al. | |
| 6,078,907 A | 6/2000 | Lamm | |
| 6,085,177 A | 7/2000 | Semple et al. | |
| 6,097,834 A | 8/2000 | Krouse et al. | |
| 6,098,053 A | 8/2000 | Slater | |
| 6,119,106 A | 9/2000 | Mersky et al. | |
| 6,119,107 A | 9/2000 | Polk | |
| 6,119,109 A | 9/2000 | Muratani et al. | |
| 6,122,625 A | 9/2000 | Rosen | |
| 6,128,603 A | 10/2000 | Dent et al. | |
| 6,173,272 B1 | 1/2001 | Thomas et al. | |
| 6,182,052 B1 | 1/2001 | Fulton et al. | |
| 6,289,322 B1 * | 9/2001 | Kitchen et al. | 705/40 |
| 6,292,789 B1 * | 9/2001 | Schutzer | 705/40 |
| 6,327,577 B1 | 12/2001 | Garrison et al. | |
| 6,334,116 B1 | 12/2001 | Ganesan et al. | |
| 6,363,362 B1 | 3/2002 | Burfield et al. | |
| 6,381,584 B1 | 4/2002 | Ogram | |
| 2001/0002535 A1 | 6/2001 | Liebig et al. | |
| 2001/0037295 A1 | 11/2001 | Olsen | |
| 2001/0037296 A1 | 11/2001 | Ganesan et al. | |
| 2001/0044776 A1 | 11/2001 | Kight et al. | |
| 2002/0002536 A1 * | 1/2002 | Braco | 705/40 |
| 2002/0010677 A1 | 1/2002 | Kitchen et al. | |
| 2002/0013768 A1 | 1/2002 | Ganesan | |
| 2002/0019809 A1 | 2/2002 | Kitchen et al. | |
| 2002/0046165 A1 | 4/2002 | Kitchen et al. | |
| 2002/0046166 A1 | 4/2002 | Kitchen et al. | |
| 2002/0046167 A1 | 4/2002 | Kitchen et al. | |
| 2002/0046168 A1 | 4/2002 | Kitchen et al. | |
| 2002/0049671 A1 * | 4/2002 | Trende et al. | 705/40 |
| 2002/0049672 A1 | 4/2002 | Kitchen et al. | |
| 2002/0052840 A1 | 5/2002 | Kitchen et al. | |
| 2002/0062282 A1 | 5/2002 | Kight et al. | |
| 2002/0065773 A1 | 5/2002 | Kight et al. | |
| 2002/0087427 A1 | 7/2002 | Ganesan et al. | |
| 2002/0087461 A1 | 7/2002 | Ganesan et al. | |
| 2002/0087465 A1 | 7/2002 | Ganesan et al. | |
| 2002/0087468 A1 | 7/2002 | Ganesan et al. | |
| 2002/0087469 A1 | 7/2002 | Ganesan et al. | |
| 2002/0087471 A1 | 7/2002 | Ganesan et al. | |
| 2002/0194125 A1 | 12/2002 | Shimada | |

FOREIGN PATENT DOCUMENTS

| | | | |
|---|---|---|---|
| EP | 1020824 | A2 | 7/2000 |
| EP | 1043668 | A2 | 10/2000 |
| EP | 1049056 | A2 | 11/2000 |
| EP | 1052603 | A2 | 11/2000 |
| EP | 1083532 | A2 | 3/2001 |
| EP | 1091330 | A2 | 4/2001 |
| EP | 1111559 | A2 | 6/2001 |
| EP | 1136922 | A1 | 9/2001 |
| EP | 1136923 | A1 | 9/2001 |
| EP | 1136924 | A1 | 9/2001 |
| GB | 2294566 | A | 5/1996 |
| WO | WO99/05628 | | 2/1999 |
| WO | WO99/07102 | | 2/1999 |
| WO | WO99/10823 | | 3/1999 |
| WO | WO99/13421 | | 3/1999 |
| WO | WO99/15999 | | 4/1999 |
| WO | WO 99/18529 | | 4/1999 |
| WO | WO99/42944 | | 8/1999 |
| WO | WO99/58339 | | 11/1999 |
| WO | WO00/42551 | | 7/2000 |
| WO | WO00/48085 | | 8/2000 |
| WO | 00/79420 | | 12/2000 |
| WO | 01/52142 | | 7/2001 |
| WO | WO01/77938 | | 10/2001 |
| WO | 02/03229 | | 1/2002 |
| WO | WO 02/14985 | | 2/2002 |

OTHER PUBLICATIONS

Richard K. Crone, American Banker, vol. 165, Iss. 94, p. 12 "Comment: Banks Should Help Billers Employ Screen Scraping" May 16, 2000.*

Council for Electronic Billing and Payment. Business-to-Business EIPP: Presentment Models and Payment Options, Part One: Presentment Models. Jan. 2001, National Automated Clearing House Association, Herndon, VA.

Council for Electronic Billing and Payment. Business-to-Business EIPP: Presentment Models and Payment Options, Part Two: Payment Options, Jan. 2001, National Automated Clearing House Association, Herndon, VA.

Arald Jean-Charles and Suras D. Joshi, Architectural Choices for OSS Integration, eAI Journal, Sep. 2001, pp. 59-63.

(56) References Cited

OTHER PUBLICATIONS

Interoperabill Initiative of the Banking Industry Technology Secretariat (BITS), Electronic Bill Presentment and Payment (EBPP) Business Practices, May 9, 2000, Edition 2.1, Draft for Comment, Council for Electronic Billing and Payment of the National Automated Clearing House Association (NACHA).
Business Practices Task Force of Nacha's Council for Electronic Billing and Payment. An Overview of Electronic Bill Presentment and Payment Operating Models: Process, Roles, Communications, and Transaction Flows. Apr. 9, 1999.
Pricewaterhousecoopers, Electronic Bill Presentment and Payment: A Primer, Zurich-Oerlikon.
James S. Diggs, Electronic Commerce and the Document: An Old Lexicon Re-Energized, Xploration Spring, 1997, pp. 26-29.
Netdelivery Corporation, EDM: Electronic Delivery Management: The Delivery Service for Electronic Commerce, Boulder, CO.
Robert Landry, Ian Rubin, Richard Bell, Retail Banking Delivery Technology: Channels in Transition, Financial Services Technology Conference, Apr. 27-28, 1998. The Tower Group, Newton, MA.
Robert Landry, Forecasting How U.S. Delivery Channels Will Play Out, FutureBanker, Aug. 1997, pp. 46-49.
Gary B., Meshell, A Perspective on Electronic Commerce and Payments, Price Waterhouse.
No Author Name Given, Visa-Home Banking & Bill Payment Solution, Visa Interactive.
No Author Name Given, Paysense: The Way Payments Will Be, Trisense Software, Ltd., Burnsville, MN.
Killen & Associates, Electronic Bill Presentment and Payments: Markets, Framework and Suppliers, vol. 1 of a 3 Study Set, Palo Alto, CA.
Thomas P. Vartanian, Future Banking: Reinventing the Bank As an Idea Factory, American Banker, Aug. 19, 1998.
Thomas P. Vartanian, Future Banking: Key Question for Emerging Systems: Where is the Money? American Banker, Jun. 17, 1996.
Charles G. Moody, III, From the Publisher: Outsourcing, American Waste Digest, Jul. 1998, p. 9.
No Author Name Given, Everyone's Knocking on Home Banking's Door, Business Week, Sep. 24. 2001.
No Author Name Given, Bill Gates is Rattling the Teller's Window, Business Week, Sep. 24, 2001.
No Author Name Given, Call it E-Money Management, Business Week, Sep. 24, 2001.
The Advisory Board Company, A Proposition Beyond Rescue: The Pure Play Advantage, 1998, pp. 41-72.
The Advisory Board Company. Chapter III: Creating New Payments Businesses, 1996, pp. 283-298.
The Advisory Board Company. VI: Creating New Payments Businesses, 1996, pp. 113-146.
ASC X12 Finance Subcommittee, Models for Consumer Billing and Payment Systems, Jun. 1995, Technical Report Type 2.
ASC X12 Finance Subcommittee, Models for Consumer Biting and Payment Systems, Oct. 1995, Technical Report Type II.
Michael C. McChesney. Banking in Cyberspace: an Investment in itself, Banking/Investing, IEEE Spectrum, Feb. 1997, pp. 54-63.
No Author Name Given, Online Banking Report, Home Banking Partners, Issue 32, Dec. 1997.
Chip Wickenden, CCM, The Next Wave, Consumer EDI.
Just in Time Solutions. AT&T and Intuit, Open Internet Billing: White Paper, Jun. 1998.
David Lamm, The Effect of the Internet on Payment Processing, The Association for Work Process Improvement, Apr. 27, 1999, Boston, MA.
Leslie Thwaits, The Check's on the Net: CheckFree is Making Electronic Commerce Hassle Free, SourceBook, Apr. 1999. pp. 17-20, The Reddy Corporation International.
ASC X12 Finance Subcommittee, Reference Model for Addressing Financial Transactions, Technical Report Type 2, Jun. 1998.
VISA, Consumer Electronic Invoice Presentment: Not Your Everday EDI, StertConf.
ASC X12 Finance Subcommittee, Consumer Service Provider Billing & Payment System Work Group, Meeting Notes from Jun. 1995 X12F Trimester Meeting, Sep. 1995.
VISA, Bill Interest in Electronic Remittance, Bill Payment Council Meeting, Oct. 17, 1994, Methesda, MD.
ASC X12 Finance Subcommittee, Models for Payment Systems, Technical Report Type 2, ASC X12 Procedures Review Board, Feb. 1995.
Richard K. Crone, Screen Scraping: The Monster IBPP Wave You Absolutely Must Catch, IBPP Strategies and Trends, Dove Consulting.
Richard K. Crone, Unlocking Treasures Untold: The Revenue Generating Power of IBPP and Anonymous Profile Marketing, Dove Consulting.
A. Litan, The Consumer E-Billing Hype Cycle, Research Note, Dec. 19, 2000, GartnerGroup.
A. Litan, Consumer E-Billing Shakeout: The Dust Starts to Settle, Research Note Oct. 3, 2000, GartnerGroup.
K. Kerr and A. Litan, Trends in Bsuiness-to-Consumer Electronic Bill Presentment and Payment, Context Overview Report. Aug. 25, 2000, GartnerGroup.
A. Litan, Consumer E-Bill Payment: Built, but When Will They Come? Research Note, Feb. 18, 2000, GartnerGroup.
A. Litan, Three Banks Enter E-Billing Race with Post Office Model, Research Note, Jul. 15, 1999, GartnerGroup.
A. Litan, Future Bill Distribution: Internet Post Office Model, Research Note, Apr. 9. 1999, GartnerGroup.
Gaston Hummel, EBPP, Group 1 Software Europe, Ltd., Sep. 11, 2001.
Nicolette Lemmon, David Gourley and James Ward, Member Acceptance of Electronic Access Systems: Innovators versus Laggards, Center for Credit Union Research, University of Wisconsin-Madison School of Business and the Filene Research Institute, 1999.
Billserv, EBPP White Paper.
David B. Humphrey, Ph.D., Prospective Changes in Payment Systems: Implications for Credit Unions, Florida State University, Center for Credit Union Research, University of Wisconsin-Madison School of Business and the Filene Research Institute, 1997.
Jody Cornish and Octavio Marenzi, Scan and Pay Services: The Future of Electronic Bill Presentment, Celent Communications, May 2000, Cambridge, MA.
Jody Cornish, Octavio Marenzi and Sang Lee, Banks and Electronic Bill Presentment: A Survey, Celent Communications, Apr. 2000, Cambridge, MA.
Avolent, Using BizCast to Capture ROI and Automate the Invoice-to-Pay Process, Avolent B2B White Paper, 2001, pp. 20-28.
Avolent, The Return on Investment of EIPP, Avolent B2B White Paper, pp. 14-19.
Avolent, Market Evolution for EIPP, Avolent B2B White Paper, pp. 10-13.
Greg Sward and Brian Valente, Successfully Automating the Invoice-to-Pay Process. Avolent B2B White Paper, Feb. 2001, pp. 1-9.
Stoneman, B., Fitting It All Together, Banking Strategies, Mar./Apr. 2000, vol. 76, No. 2, pp. 50-58.
Hallerman. D., Banks Strike Back With an E-Bill Challenge, Bank Technology News, Aug. 1999.
No Author Name Oven, Non-Bank Puts E-Payments At ATMs to the Test, Bank Network News, May 1999.
Sharon Osberg, "Wells Fargo: Standards-Based Electronic Bill Presentment and Payment (EBPP)", Nov. 1999, XP-002192923.

* cited by examiner

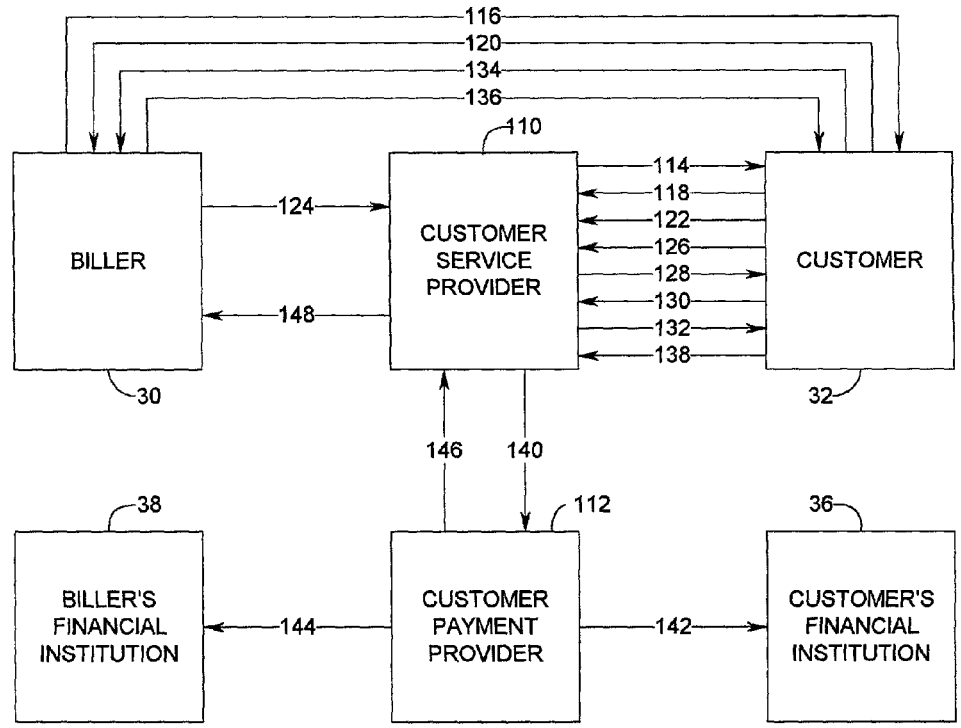
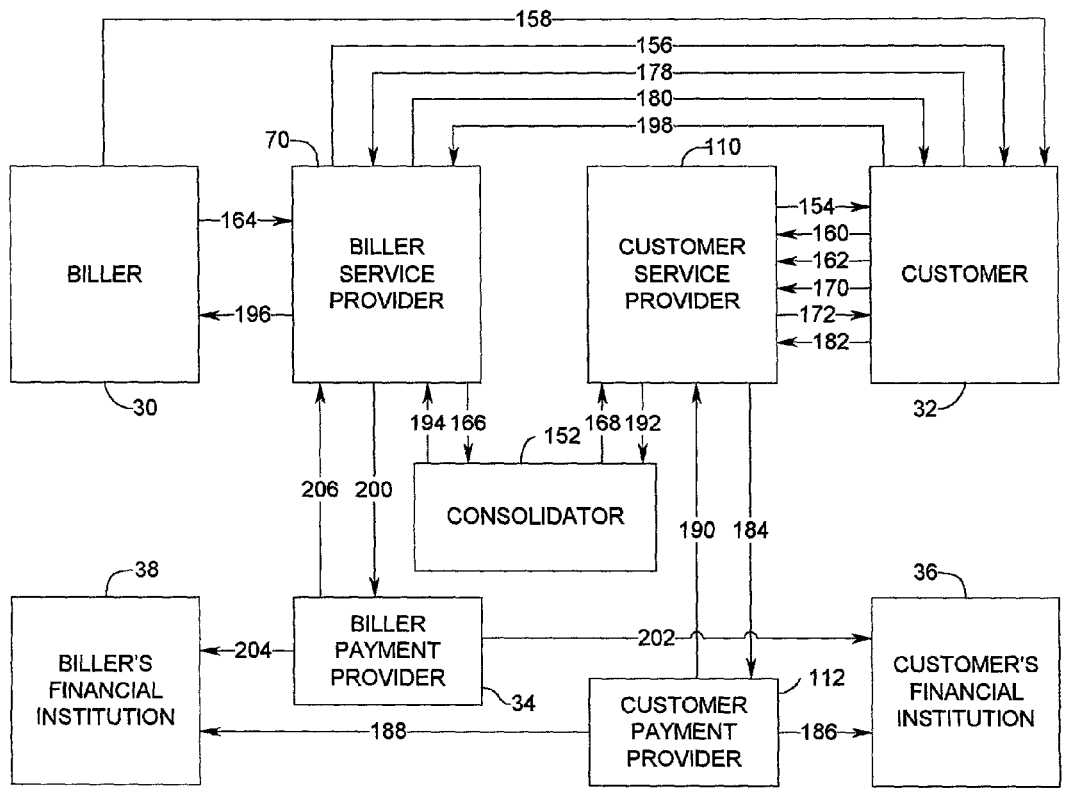

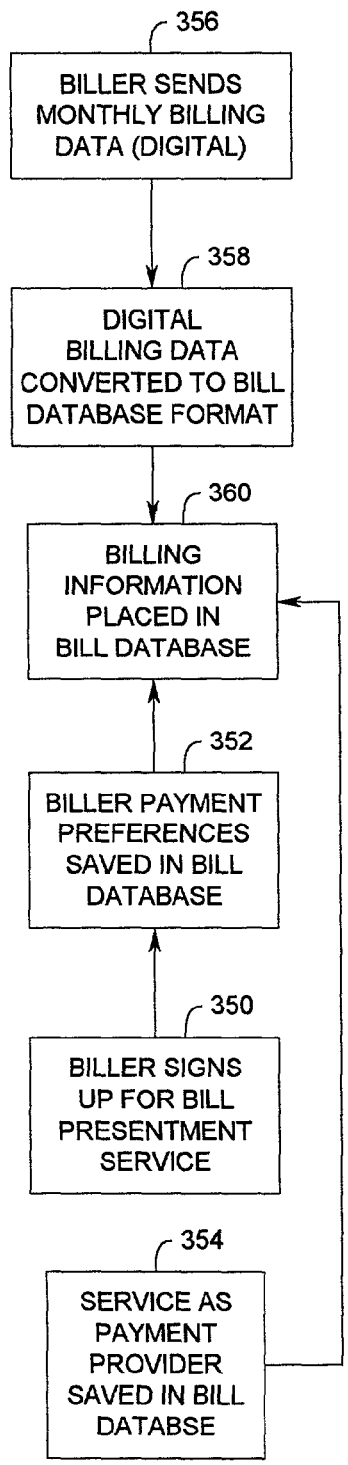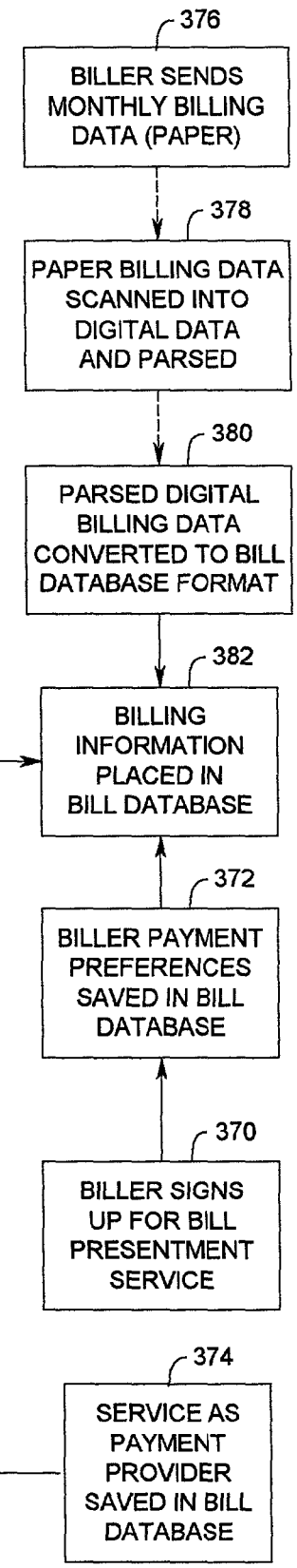

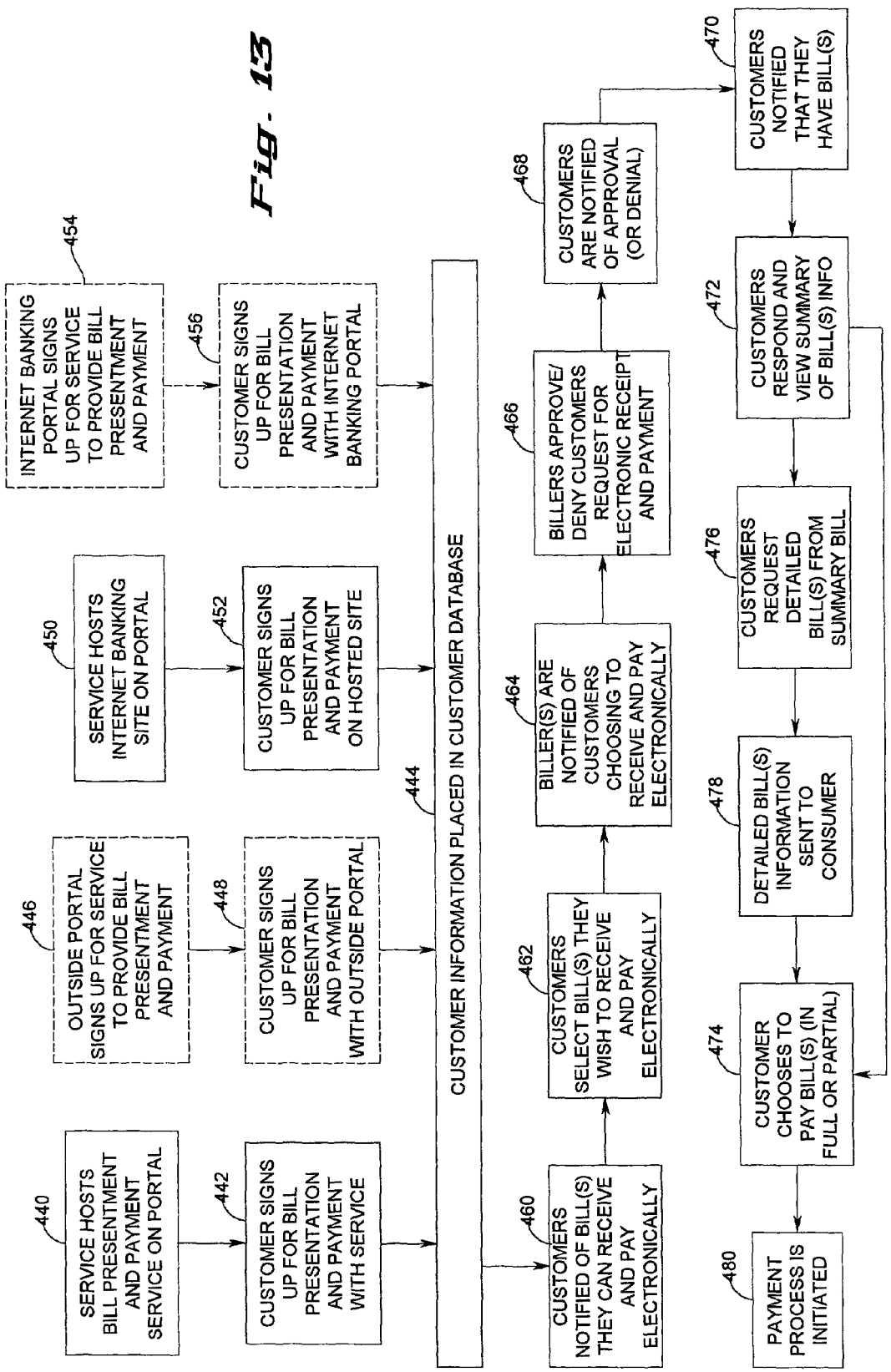

INTEGRATED BILL PRESENTMENT AND PAYMENT SYSTEM AND METHOD OF OPERATING THE SAME

IDENTIFICATION OF RELATED PATENT APPLICATION

This application is related to concurrently filed copending U.S. patent application Ser. No. 10/141,244, entitled "Business Combined Bill Management System and Method," which application is hereby incorporated herein by reference.

BACKGROUND OF THE INVENTION

Field of the Invention

The present invention relates generally to the electronic presentation and payment of bills, and more particularly to an integrated bill presentment and payment system and an associated method which can accomplish the entire process of bill presentment and payment directly with billers, customers, and their respective financial institutions, but is also capable of interfacing with independent biller service providers, independent customer service providers, independent consolidators, and/or independent payment providers.

Electronic bill payment is a service which has been touted as being just around the corner for at least the past fifteen years. In view of the fact that the typical consumer spends an average of two hours per month paying his/her share of the eighteen billion bills a year that are sent to consumers in the U.S. alone, the reasons for the enormous potential of electronic bill payment are readily apparent. The cost of sending conventional bills and paying conventionally are high for both businesses and consumers. Businesses in the U.S. alone send or receive over twenty-six billion bills a year at a cost exceeding seventeen billion dollars annually. In the process of paying these bills, consumers in the U.S. alone spend more than six billion dollars annually in postage.

In addition, banks spend a large amount of money on the processing of paper checks, and they are not reimbursed for this cost by those consumers who have free checking. Thus, the potential beneficial effect of electronic bill payment for cost reduction and revenue production to all participants—billers, consumers, banks, and service providers—represents a tremendous opportunities for the financial industry. This financial opportunity is expected to rapidly expand the market for electronic bill payment via the Internet in the years to come.

Despite this optimism, the electronic bill payment industry has not matured rapidly, and remains at best a niche market. Banks and other members of the financial community have not aggressively pursued the development and promotion of electronic bill payment services, even though their customers include both the billers and the consumers. Most banks lack the infrastructure to develop such services internally, and, although outsourcing these services has not represented an unacceptably high cost, developing and supporting this technology in-house as a "loss leader" presents an unacceptably negative rate of return on the requisite investment, at least in the short term.

Due to the slower than anticipated rate of adoption of electronic bill payment, service providers in the industry have experienced slow growth and earnings which are lackluster at best, with at least one of the largest companies having never made a profit despite being in the business for over a decade. In addition, many billers have not been able to reach enough consumers to justify either the initial cost or the ongoing cost of offering online bill presentment. Since many billers have not presented their bills electronically, limiting the opportunity for consumers to view and pay their bills online to relatively few companies, there has not been sufficient encouragement to consumers to select the online bill payment solution.

At the present time, four different electronic presentment and payment models are being used: the direct model, the biller service provider ("BSP") direct model, the service provider model (which uses a customer service provider ("CSP")), and the "cafeteria" model (which introduces consolidators). Each of these four models will be discussed briefly below, and the deficiencies of each model will be noted in passing. For various reasons, none of these systems have succeeded, since each suffers from significant drawbacks.

The first electronic bill presentment and payment model is the direct model, in which the biller uses a page on its website as a location at which its customers can view and pay their account with the particular biller hosting the website. The operation of this presentment and payment model may be as simple as the biller sending each customer an e-mail containing the entire bill. Of the four models mentioned herein, the direct model presents the most obstacles to its success, with consumers being required to navigate many different websites each month to pay the bills. Consider that any electronic bill presentment and payment system must have a high degree of security, complete with user names and passwords. Multiply this need by the number of bills the typical consumer gets each month, and the number of user names and passwords alone is daunting. Add the time required to log into the website of each biller separately, as compared with opening a number of paper bills at the same time (e.g., weekly), writing checks for each, and mailing the payments, and it is no surprise that consumers have stayed away from this "solution" in droves.

The second electronic bill presentment and payment model is the biller service provider direct model, a modification of the direct model discussed above, in which a third party service provider signs up multiple billers, receives billing information from each of the billers, and converts the bills from each of the billers to electronic form so that they may be presented to customers of the serviced billers. The biller service provider model requires customers to log into a different web address for each of the billers serviced, and thus does not allow a single logon to review and pay all the bills hosted by the biller service provider. In fact, the customers will not even know that they are not 'logged onto the billers' websites, meaning that the biller service provider model is convenience for billers but not for customers.

Typically, the customer must log on to the biller service provider site to pay the entire bill, to pay part of the bill, or to request additional bill details (such as those typically found in a monthly paper statement) prior to payment. Biller service providers periodically send bill notifications to their customers to notify them of the receipt of one or more new bill(s). This notification typically includes a link to a secure site allowing the customers to access an entry (log-on) page by clicking on the link. Optionally, biller service providers can also deliver either summary billing information ("thin bills") or the entire bill ("thick" bills) to the user through an email. Generally, these communications are done through secure e-mail channels.

This approach can also be used to allow customers to send a quick payment transaction to the biller using the secure reply channel. Since there are a number of such biller service providers, each biller typically sends its bills only to a single biller service provider. Due to this limitation, it will be appreciated that the biller service provider model has essentially the same limitations as the biller direct model, serving as a convenience only for billers while presenting all of the disadvantages of the biller direct model to consumers. To overcome this disadvantage, biller service providers are also developing capabilities to send bills to multiple service providers (as discussed below) so that the service providers can further distribute the billing information to their affiliated customer base.

The third electronic bill presentment and payment model is the service provider model, in which customers enroll with a third party customer service provider, which then delivers electronic bills obtained from billers or biller service providers to the customers. The bills delivered can be either "thick" bills, which include all of the details found in a typical monthly paper statement, or more typically "thin" bills, which are summary in nature with additional details provided upon request. This model requires customers to enroll with each of their billers following initial enrollment with the customer service provider, and presents the advantage that multiple bills may be reviewed by customers at a single location.

Unfortunately, like the biller service provider direct model described above, the service provider model is only as good as the number of billers it obtains bills from. From the customer's standpoint, if a customer service provider does not have bills for all of the billers the customer would like to pay, the customer must go to multiple customers service providers, biller service providers, or billers to view and pay all of the consumer's electronically presented bills, which is obviously undesirable from the customer's standpoint. This disadvantage, in part, has lead to the development of a fourth electronic bill presentment and payment model.

The fourth electronic bill presentment and payment model is the "cafeteria" model, which combines aspects of the three previous models and cobbles these pieces together in a sort of electronic jigsaw puzzle using yet another service provider referred to as a consolidator. The function of the consolidator is to route and distribute bills from BSP's to CSP's. It is in this model in which CheckFree Corporation, the largest company in the electronic bill presentment and payment business, is presently operating, serving as a customer service provider (albeit one which may have its own proprietary consolidator, BSP, and CSP functions and which does not share bills with other customer service providers). In the cafeteria model, each of the service providers has a cost, and the ultimate cost (which is borne by the biller and passed on to its customers) is the sum of these costs. Thus, it is readily apparent that the cafeteria system is potentially the most expensive of the four systems discussed herein.

In addition, while the number of bills which can be accessed by a consumer at a single customer service provider is certainly increased by the cafeteria model, there are a number of "non-collaborative" networks which to date have prevented consumers from reaching all of their bills on a single service provider. From the customer's standpoint, since inevitably no customer service provider has bills for all of the billers the customer would like to pay, the customer must either go to multiple providers to view and pay all of the consumer's electronically presented bills, or convince its customer service provider to add the bills of additional billers. From the biller's standpoint, since it typically has only a single biller service provider, it will not typically provide its bills to a second service provider (recall that biller service providers require billers to pay for the service).

As described above, some biller service providers have been attempting to address these limitations by attempting to interact with new service providers. This is generally a very costly exercise because there are no widely used standards for billing information communication and distribution. Each service provider, in an effort to attain a competitive edge, has developed its own proprietary interfaces, communication methods, certification methods, and policies and procedure, all of which require substantial investments from the biller service providers to develop.

It is accordingly the primary objective of the present invention that it provide an open, integrated, end-to-end bill presentment and payment system which interfaces with both billers and customers to electronically present bills to the customers and to allow the customers to electronically pay the bills. As such, it is an objective of the integrated bill presentment and payment system that it present all of the advantages of a biller service provider in its interface with billers, as well as all of the advantages of a customer service provider in its interface with customers. It is a related objective that the integrated bill presentment and payment system be capable of accepting billing information electronically, in paper form, or as a print stream (a data file sent to a printer to cause it to print, consisting of electronic signals representing the actual text to be printed, electronic signals representing the layout and formatting of the text being printed, and any other electronic signals necessary to drive the printer). It is a further objective of the integrated bill presentment and payment system that its bill payment capability be sufficiently sophisticated so as to pay bills using the limitations of what forms of payment billers will accept, what forms of payment may be made on behalf of customers, costs of various payment methods, as well as risk-limiting strategies built into the integrated bill presentment and payment system.

It is another objective of the integrated bill presentment and payment system of the present invention that, while as an end-to-end bill system it eliminates the need for consolidators, it is capable of interfacing with them to handle as much of an alternative linkage between billers and customers as it is allowed to. As such, the integrated bill presentment and payment system of the present invention must be capable of accepting billing information from billers hosting their own billing information, billing service providers having captive billers, and consolidators routing and distributing bills from billing service providers which the integrated bill presentment and payment system does not have other access to. In addition, the integrated bill presentment and payment system must be capable of providing billing information to, and receiving payment instructions from, customer service providers having captive customers and consolidators dealing with such customer service providers.

The integrated bill presentment and payment system of the present invention must also operate in a manner which is both secure and effective, and it should also require little effort on the part of consumers to sign up for it or to use it to view and pay bills. In order to enhance the market appeal of the integrated bill presentment and payment system of the present invention, it should also be economically efficient by virtue of its end-to-end design to minimize its cost and thereby afford it the broadest possible market. Finally, it is also an objective that all of the aforesaid advantages and objectives of the integrated bill presentment and payment system of the present invention be achieved without incurring any substantial relative disadvantage.

SUMMARY OF THE INVENTION

The disadvantages and limitations of the background art discussed above are overcome by the present invention. With this invention, an integrated, end-to-end bill presentment and payment system has connectivity which allows it to interface with any biller or customer, either directly or indirectly. Indirect connections to billers or customers are possible through interfaces with independent biller service providers and/or customer service providers and/or consolidators, as well as through portals hosted by third parties. The integrated bill presentment and payment system of the present invention operates in a manner wherein it provides as much of the overall system functionality as possible, thereby maximizing the efficiency of the system.

The preferred embodiment of the integrated bill presentment and payment system of the present invention has four main components: a BSP function component, a CSP function component, a bill payment function component, and a connection logic component which interconnects the other three components. In addition, these components can include a unique external interface (proprietary and/or standard based) with outside networks (which may be fully or partially collaborative). It allows the present invention to be highly beneficial to the overall industry by helping to provide, cost effectively, for all stakeholders an ability to communicate with each other. For example, either a biller or a biller service provider can develop just one interface to communicate to the invention, and the invention can distribute information based on the biller's or biller service provider's requirements.

Similarly, other service providers and consumer service providers will not need to be "boxed-in" with their own affiliates; using the present invention, they can also get the benefit of a much wider user base either from the biller community (to receive bills therefrom) or to the consumer or business bases (to send the bills thereto). The BSP function component serves to obtain billing data and create electronic billing information. The CSP function component serves to provide bills to consumers and to receive payment instructions from consumers for the bills so provided. The bill payment function component pays the bills for which the consumers have initiated payment.

The preferred manner for the BSP function component of the integrated bill presentment and payment system of the present invention to interface with billers is directly. The integrated bill presentment and payment system can accept the billing data electronically (either as raw data or as a print stream with the images, formats and marketing messages billers want which would if provided to a printer result in complete detailed bills being printed) or in paper form (in the latter case the paper bills are scanned and the billing information is extracted from the scanned data). Alternately, the integrated bill presentment and payment system accepts billing data from a third party biller service provider, either directly or through a consolidator.

Similarly, the preferred manner for the CSP function component of the integrated bill presentment and payment system of the present invention to interface with customers is directly, via a hosted portal (either a dedicated portal or a portal hosted for a third party) or any other single or multi-purpose web site such as a bank's Internet website. Alternately, the integrated bill presentment and payment system accepts interfaces with customers through customer service providers, either directly or through a consolidator.

The preferred manner for the bill payment function component of the integrated bill presentment and payment system of the present invention to arrange for payment of bills is to do so directly without third party bill payment services interposed between the service provider of the integrated bill presentment and payment system and the payment providers such as Automated Clearing House (ACH) processors and credit/debit card processors (for non-paper transactions) or check processors (for paper transactions such as checks and drafts). Alternately, the integrated bill presentment and payment system can interface with third party bill payment services (either biller payment provider or customer payment provider).

In certain applications, integrated portals can also be included in the integrated bill presentment and payment system of the present invention. For example, in order to allow consumers to interact directly with the integrated bill presentment and payment system, an electronic bill presentment and payment portal can be provided. This electronic bill presentment and payment portal interfaces with the CSP function component. In addition, a third party-labeled portal can also be included in the integrated bill presentment and payment system of the present invention. This would most commonly be done as an electronic banking portal done for a financial institution not desiring to host its own portal.

In its operation, the integrated bill presentment and payment system of the present invention receives billing data from billers in a variety of formats, and converts that billing data into electronic billing information, which is stored in a database (multiple databases can be used if so desired). The billing information is provided to consumers who are signed up to access billing information through the integrated bill presentment and payment system. In response to the consumers initiation of the payment of bills, the bill payment instruction is performed (internally if possible, using the allowed and preferred modes of payment accepted by each biller, the allowed modes of payment for each consumer, and internal risk considerations). Inputs from and outputs to external third party bill presentment and payment components are also utilized, with the guiding principle of the integrated bill presentment and payment system of the present invention being that it attempts to perform, to the highest degree possible, as much of the presentment and payment of bills as is permitted by the billers, biller service providers, consumer service providers, consolidators, portals, and any other service providers.

The integrated bill presentment and payment system of the present invention may be implemented in a variety of ways, two examples of which are described in this specification. First, each of the components of the integrated bill presentment and payment system may be implemented on a discrete server, with each server having a database. Alternatively, the functions of all of the components of the integrated bill presentment and payment system may instead be implemented on a single computer. Other manners of accomplishing the implementation on the integrated bill presentment and payment system will be apparent to those skilled in the art.

It may therefore be seen that the present invention teaches an integrated, end-to-end bill presentment and payment system which interfaces with both billers and customers to electronically present bills to the customers and to allow the customers to electronically pay the bills. As such, the integrated bill presentment and payment system presents all of the advantages of a biller service provider in its interface with billers, as well as all of the advantages of a customer service provider in its interface with customers. The integrated bill presentment and payment system is capable of accepting billing information electronically, in paper form, or as a print stream. Its bill payment capability is sufficiently sophisticated so as to pay bills using the limitations of what forms of payment billers will accept, the forms of payment which may be made on behalf of customers, costs of various payment methods, and risk-limiting strategies which are built into the integrated bill presentment and payment system.

As an end-to-end bill system, the integrated bill presentment and payment system of the present invention eliminates the need for consolidators; however, it is capable of interfacing with them to handle as much of an alternative linkage between billers and customers as it is allowed to. As such, the integrated bill presentment and payment system of the present invention is capable of accepting billing information from billers hosting their own billing information, from billing service providers having captive billers, and from consolidators routing and distributing bills from billing service providers which the integrated bill presentment and payment system does not have other access to. In addition, the integrated bill presentment and payment system is capable of providing billing information to, and receiving payment instructions from, customer service providers having captive customers and consolidators dealing with such customer service providers.

The integrated bill presentment and payment system of the present invention operates in a manner which is both secure and effective, and it requires little effort on the part of consumers to sign up for it or to use it to view and pay bills. The integrated bill presentment and payment system of the present invention is also economically efficient by virtue of its end-to-end design to minimize its cost and thereby afford it the broadest possible market. Finally, all of the aforesaid advantages and objectives of the integrated bill presentment and payment system of the present invention are achieved without incurring any substantial relative disadvantage.

DESCRIPTION OF THE DRAWINGS

These and other advantages of the present invention are best understood with reference to the drawings, in which:

FIG. 3 is a functional schematic diagram of a previously known customer service provider bill presentment and payment system in which a customer engages a customer service provider to electronically obtain bills from the biller for the customer, the customer electronically paying the bills using a customer payment provider which is typically affiliated with the customer service provider;

FIG. 4 is a functional schematic diagram of a previously known cafeteria-style bill presentment and payment system in which a biller engages a biller service provider (independent of a consolidator or otherwise) to electronically send bills on behalf of the biller, a customer engages a customer service provider (independent of a consolidator or otherwise) to electronically obtain bills for the customer, and a consolidator facilitates communication between the biller service provider and the customer service provider;

FIG. 8 is a flow diagram illustrating the process by which a biller interfaces with a service provider operating the integrated bill presentment and payment system of the present invention to have the biller's electronic billing information converted and saved in the integrated bill presentment and payment system's database;

FIG. 9 is a flow diagram illustrating the process by which a biller interfaces with a service provider operating the integrated bill presentment and payment system of the present invention to have the biller's paper-based billing information converted and saved in the integrated bill presentment and payment system's database;

FIG. 13 is a flow diagram illustrating the process by which customers interfacing with the integrated bill presentment and payment system of the present invention through its customer service provider function sign up for bill presentment and payment, obtain bills, and initiate the payment of bills;

DETAILED DESCRIPTION OF THE PREFERRED EMBODIMENT

Figure 1:
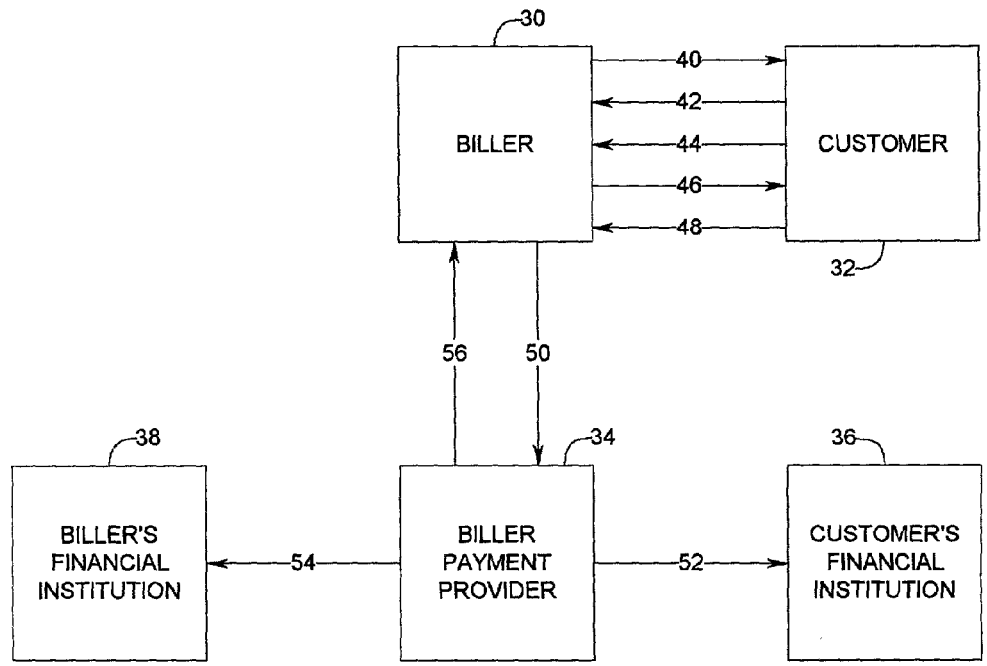
FIG. 1 is a functional schematic diagram of a previously known direct bill presentment and payment system in which a biller itself electronically sends bills to a customer and the customer electronically pays the bills.

Prior to engaging in a discussion of the integrated bill presentment and payment system of the present invention, it is useful to briefly discuss previously implemented ways of presenting and paying bills. Referring first to FIG. 1, an example of the first type of previously known bill presentment and payment system, the direct model, is illustrated. In this system, a biller 30 has a customer 32 whom the biller 30 desires to provide the ability to electronically present bills which the customer 32 may pay electronically. Other parties to the system are a biller payment provider 34 which the biller 30 has engaged to facilitate payment by the customer 32 to the biller 30, the customer's financial institution 36, and the biller's financial institution 38.

The process practiced by the direct bill presentment and payment system illustrated in FIG. 1 is shown by a series of electronic data transfers, each of which is identified by a reference numeral. The process begins with the biller 30 sending the customer 32 a message promoting the bill presentment and payment service as indicated by reference numeral 40 and requesting the customer 32 to sign up for the service. The customer 32 responds by enrolling in the service as indicated by reference numeral 42. Next, the customer 32 logs onto the website of the biller 30 which hosts the bills as indicated by the reference numeral 44. The website of the biller 30 then sends billing information for the account of the customer 32 to the customer 32, as indicated by the reference numeral 46.

The customer 32 then gives payment instructions to the website of the biller 30 to make a payment on the bill as indicated by the reference numeral 48. In response, the website of the biller 30 forwards payment instructions to the biller payment provider 34 as indicated by the reference numeral 50. The biller payment provider 34 then sends a payment debit message 52 to the customer's financial institution 36, which debits the account of the customer 32. Simultaneously, the biller payment provider 34 sends a payment credit message 54 to the biller's financial institution 38, which credits the account of the biller 30. Simultaneously with the payment debit message 52 and the payment credit message 54, a payment credit information message 56 is sent by the biller payment provider 34 to the biller 30.

Figure 2:
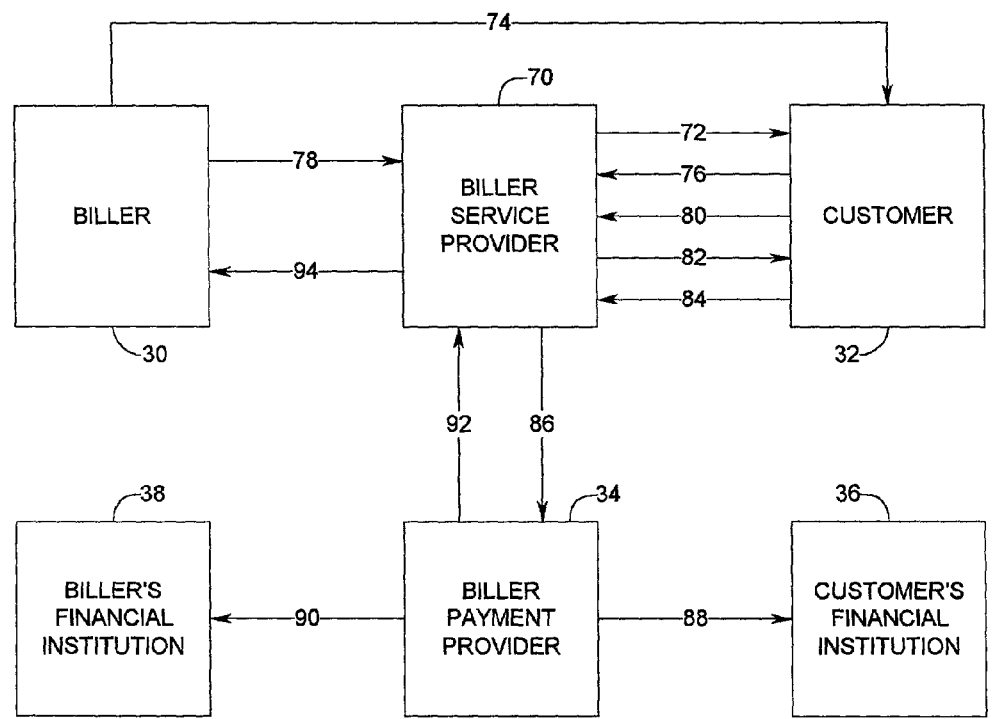
FIG. 2 is a functional schematic diagram of a previously known biller service provider bill presentment and payment system in which a biller engages a biller service provider to electronically send bills on behalf of the biller to a customer and the customer electronically pays the bills using a biller payment provider which is typically affiliated with the biller service provider.

Referring next to FIG. 2, an example of the second type of previously known bill presentment and payment system, the biller service provider model, is illustrated. In this system, a biller service provider 70 is added to the system which was discussed above in conjunction with FIG. 1. The process begins with the biller service provider 70 sending the customer 32 a message promoting the bill presentment and payment service as indicated by reference numeral 72 and requesting the customer 32 to sign up for the service. Alternately, the biller 30 may instead send the customer 32 a message promoting the bill presentment and payment service as indicated by the reference numeral 74 and requesting the customer 32 to sign up for the service. The customer 32 responds by enrolling in the service to activate the biller 30 as indicated by reference numeral 76.

Billing data is communicated by the biller 30 to the biller service provider 70, as indicated by reference numeral 78. Next, the customer logs onto the website of the biller service provider 70, as indicated by the reference numeral 80. The website of the biller service provider 70 then sends billing information for the account of the customer 32 to the customer 32, as indicated by the reference numeral 82. This billing information can be either thin (summary) or thick (complete) billing information. Typically, it will be thick billing information, which better enables the biller 30 to get its marketing messages in front of the customer 32. Since only a single bill at time may be presented to the customer 32 in this model, there is no need to provide only a summary bill initially.

The customer 32 then gives payment instructions to the website of the biller service provider 70 to make a payment on the bill as indicated by the reference numeral 84. In response, the website of the biller service provider 70 forwards payment instructions to the biller payment provider 34 as indicated by the reference numeral 86. The biller payment provider 34 then sends a payment debit message 88 to the customer's financial institution 36, which debits the account of the customer 32. Simultaneously, the biller payment provider 34 sends a payment credit message 90 to the biller's financial institution 38, which credits the account of the biller 30. Simultaneously with the payment debit message 88 and the payment credit message 90, a payment credit information message 92 is sent by the biller payment provider 34 to the biller service provider 70, and is forwarded by the biller service provider 70 to the biller 30 as indicated by the reference numeral 94.

Referring now to FIG. 3, an example of the third type of previously known bill presentment and payment system, the customer service provider model, is illustrated. In this system, a customer service provider 110 is added and a customer payment provider 112 is substituted for the biller payment provider 34 in the system which was discussed above in conjunction with FIG. 1. The process begins with the customer service provider 110 sending the customer 32 a message promoting the bill presentment and payment service as indicated by reference numeral 114 and requesting the customer 32 to sign up for the service. Alternately, the biller 30 may instead send the customer 32 a message promoting the bill presentment and payment service as indicated by the reference numeral 116 and requesting the customer 32 to sign up for the service. The customer 32 responds by enrolling in the service as indicated by reference numeral 118. The customer also notifies his billers to send his bills to the customer service provider 110 in a send bills request 120.

Next, the customer 32 logs into the website of the customer service provider 110 to activate the biller 30 as indicated by the reference numeral 122. Billing data is communicated by the biller 30 to the customer service provider 110, as indicated by reference numeral 124. Next, the customer logs onto the website of the customer service provider 110, as indicated by the reference numeral 126. The website of the customer service provider 110 then sends billing information for the account of the customer 32 to the customer 32, as indicated by the reference numeral 128. Again, this billing information can be either thin (summary) or thick (complete) billing information; for the example illustrated in FIG. 3, it is thin billing information.

The customer 32 may respond by requesting detailed billing information from the customer service provider 110 via a link contained in the summary billing information (assuming that the customer service provider 110 has the detailed billing information), as indicated by the reference numeral 130. In response, the customer service provider 110 then sends detailed billing information for the account of the customer 32 to the customer 32, as indicated by the reference numeral 132. If, on the other hand, the detailed billing information is retained by the biller 30 on its website, the customer 32 may request the detailed billing information from the biller 30 via a link to the biller contained in the summary billing information, as indicated by the reference numeral 134. In response, the biller 30 then sends detailed billing information for the account of the customer 32 to the customer 32, as indicated by the reference numeral 136.

The customer 32 then gives payment instructions to the website of the customer service provider 110 to make a payment on the bill as indicated by the reference numeral 138. In response, the website of the customer service provider 110 forwards payment instructions to the customer payment provider 112 as indicated by the reference numeral 140. The customer payment provider 112 then sends a payment debit message 142 to the customer's financial institution 36, which debits the account of the customer 32. Simultaneously, the customer payment provider 112 sends a payment credit message 144 to the biller's financial institution 38, which credits the account of the biller 30. Simultaneously with the payment debit message 142 and the payment credit message 144, a payment credit information message 146 is sent by the customer payment provider 112 to the customer service provider 110, and is forwarded by the customer service provider 110 to the biller 30 as indicated by the reference numeral 148.

Referring next to FIG. 4, an example of the fourth type of previously known bill presentment and payment system, the "cafeteria" model, is illustrated. In this system, the components of both of FIGS. 2 and 3 are used, with a consolidator 152 being interposed between the biller service provider 70 and the customer service provider 110 to facilitate communication therebetween. The process begins with the customer service provider 110 sending the customer 32 a message promoting the bill presentment and payment service as indicated by reference numeral 154 and requesting the customer 32 to sign up for the service. Alternately, the biller service provider 70 may instead send the customer 32 a message promoting the bill presentment and payment service as indicated by the reference numeral 156 and requesting the customer 32 to sign up for the service. Yet again alternately, the biller 30 may instead send the customer 32 a message promoting the bill presentment and payment service as indicated by the reference numeral 158 and requesting the customer 32 to sign up for the service. The customer 32 responds by enrolling in the service as indicated by reference numeral 160.

Next, the customer 32 logs into the website of the customer service provider 110 to activate the biller 30 as indicated by the reference numeral 162. Billing data is communicated by the biller 30 to the biller service provider 70, as indicated by reference numeral 164; by the biller service provider 70 to the consolidator 152, as indicated by reference numeral 166; and by the consolidator 152 to the customer service provider 110, as indicated by reference numeral 168. Next, the customer logs onto the website of the customer service provider 110, as indicated by the reference numeral 170. The website of the customer service provider 110 then sends billing information for the account of the customer 32 to the customer 32, as indicated by the reference numeral 172. Once again, this billing information can be either thin (summary) or thick (complete) billing information; for the example illustrated in FIG. 4, as is typical, it is thin billing information.

The customer 32 may respond by requesting detailed billing information; typically, the detailed billing information is not stored at the customer service provider 110 but rather is retained by the biller service provider 70 on its website. The customer 32 may request the detailed billing information from the biller service provider 70 via a link contained in the summary billing information, as indicated by the reference numeral 178. In response, the biller service provider 70 then sends detailed billing information for the account of the customer 32 to the customer 32, as indicated by the reference numeral 180. (Note that in some instances only summary billing information may be available, such as for example in the case where the detailed billing information is not made available on an online basis.)

The customer 32 then is ready gives payment instructions to make a payment on the bill. Here, there is a determination as to whether the bill is to be paid by the customer payment provider 112 or by the biller payment provider 34. This is typically accomplished by the Internet link which the customer clicks to pay his bill. If the pay bill button is on a page provided by the customer service provider 110, the bill will be paid by the customer service provider 110. If the pay bill button is on a page provided by the biller service provider 70, the bill will be paid by the biller service provider 70.

If the bill is to be paid by the customer payment provider 112, the customer 32 then gives payment instructions to the website of the customer service provider 110 to make a payment on the bill as indicated by the reference numeral 182. The website of the customer service provider 110 forwards payment instructions to the customer payment provider 112 as indicated by the reference numeral 184. The customer payment provider 112 then sends a payment debit message 186 to the customer's financial institution 36, which debits the account of the customer 32. Simultaneously, the customer payment provider 112 sends a payment credit message 190 to the biller's financial institution 38, which credits the account of the biller 30. Simultaneously with the payment debit message 186 and the payment credit message 188, a payment credit information message 190 is sent by the customer payment provider 112 to the customer service provider 110, and forwarded by the customer service provider 110 to the consolidator 152 as indicated by the reference numeral 192, from the consolidator 152 to the biller service provider 70 as indicated by the reference numeral 194, and from the biller service provider 70 to the biller 30 as indicated by the reference numeral 196.

If, on the other hand, the bill is to be paid by the biller payment provider 34, the customer 32 then gives payment instructions to the website of the biller service provider 70 to make a payment on the bill as indicated by the reference numeral 198. The website of the biller service provider 70 then forwards payment instructions to the biller payment provider 34, as indicated by the reference numeral 200. The biller payment provider 34 then sends a payment debit message 202 to the customer's financial institution 36, which debits the account of the customer 32. Simultaneously, the biller payment provider 34 sends a payment credit message 204 to the biller's financial institution 38, which credits the account of the biller 30. Simultaneously with the payment debit message 202 and the payment credit message 204, a payment credit information message 206 is sent by the biller payment provider 34 to the biller service provider 70, and from the biller service provider 70 to the biller 30 as indicated by the reference numeral 196.

Figure 5:
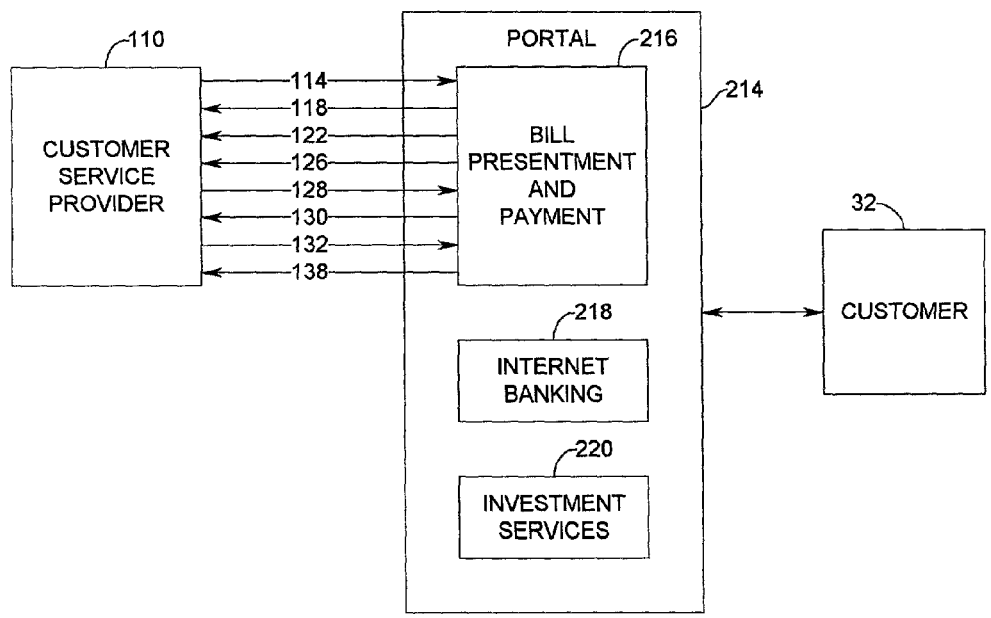
FIG. 5 is a functional schematic diagram of a portion of a previously known bill presentment and payment system in which a portal which provides services including bill presentment and payment to the customer is interposed between the customer service provider and the customer.

Referring now to FIG. 5, a variation of the customer service provider model illustrated in FIG. 3 is shown in which a portal 214 is located intermediate the customer service provider 110 and the customer 32. In the embodiment illustrated in FIG. 5, the portal 214 is an Internet banking portal featuring the functions of bill presentment and payment as indicated by the reference numeral 216, Internet banking as indicated by the reference numeral 218, and investment services as indicated by the reference numeral 220. The customer 32 logs onto the Internet banking portal 214, which accesses the customer service provider 110 when the customer 32 selects the bill presentment and payment function 216.

Figure 6:
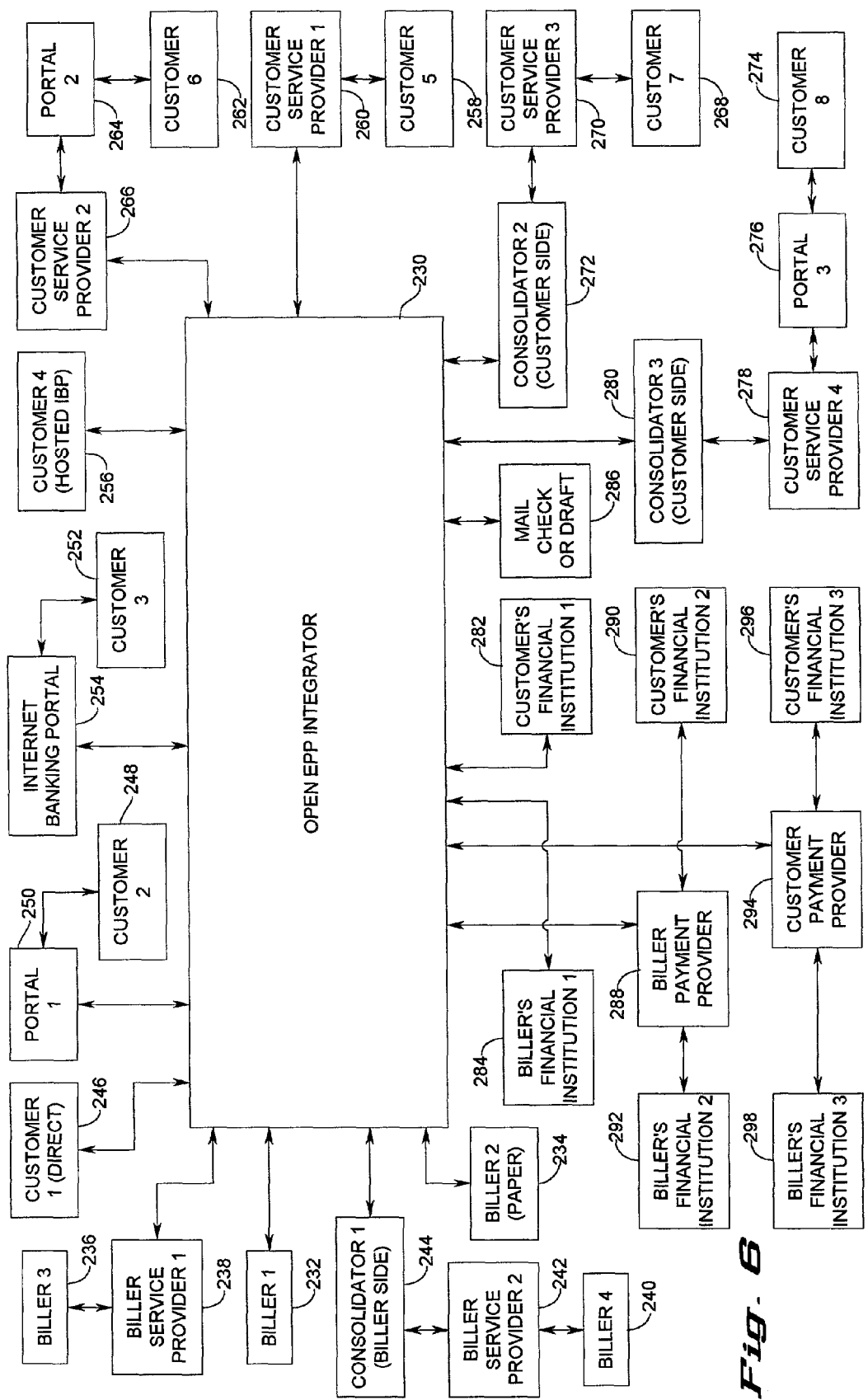
FIG. 6 is a functional schematic diagram showing an open EPP integrator constructed and operated according to the teachings of the present invention and its interconnection to various differently configured billers, customers, biller service providers, customer service providers, payment providers, consolidators, and financial institutions.

Referring next to FIG. 6, a number of examples showing the connectivity of an open EPP integrator 230 which is constructed according to the teachings of the present invention are illustrated. The open EPP integrator 230 is shown to be interfaced with billers, customers, and financial institutions according to the preferred embodiment to represent a complete bill presentment and payment solution, and also with biller service providers, customer service providers, consolidators, and payment providers to provide any subdivision of that solution which is possible to imagine.

The connection of the open EPP integrator 230 to billers to receive the billing information will be discussed first. There are at least four different ways in which billing information is supplied to the open EPP integrator 230, three of which are electronic, and the fourth of which is paper-based billing information. The first way is a direct connection from a first biller 232 to the open EPP integrator 230 in which billing data is communicated electronically from the first biller 232 to the open EPP integrator 230. In this situation, the first biller 232 will generally be providing the billing data to the open EPP integrator 230 so that the open EPP integrator 230 can convert the billing data to billing information which will then be hosted by the open EPP integrator 230. Alternately, the first biller 232 could host the billing information, with a subset of that billing information (i.e., summary information) being sent to the open EPP integrator 230.

The second way of communicating biller data is via paper bills which are provided from a second biller 234 to the open EPP integrator 230. The open EPP integrator 230 will scan the paper bills to obtain billing data, from which the billing information may be extracted.

The third way of communicating biller data involves a third party biller service provider. In this situation, a third biller 236 provides billing data to a first biller service provider 238. The first biller service provider 238 converts the billing data to billing information, hosts the billing information itself, and provides some (i.e., summary information) or all of the billing information to the open EPP integrator 230.

The fourth way of communicating biller data also involves a third party biller service provider, and additionally involves a third party consolidator. In this situation, a fourth biller 240 provides billing data to a second biller service provider 242. The second biller service provider 242 converts the billing data to billing information, hosts the billing information itself, and provides some (i.e., summary information) or all of the billing information to a consolidator 244, which in turn relays the billing information provided by the second biller service provider 242 to the open EPP integrator 230. An alternate way of obtaining biller data is by screen scraping the data from billers, biller service providers, and/or biller-side consolidators making such information available on the web.

The connection of the open EPP integrator 230 to customers to deliver billing information to customers and to receive payment instructions from customers will now be discussed. There are at least four different ways in which billing information is supplied by the open EPP integrator 230 to customers and billing instructions are received from these customers by the open EPP integrator 230. The first of these ways is via a direct connection between the open EPP integrator 230 and a first customer 246. In this situation, the open EPP integrator 230 is hosting a electronic bill presentment and payment website which the first customer 246 logs onto.

The second way of delivering billing information to customers and receiving payment instructions from customers is via a portal operated by a third party, for which the open EPP integrator 230 provides electronic bill presentment and payment services. In this situation, a second customer 248 logs onto a first portal 250, which is connected to the open EPP integrator 230 to allow the open EPP integrator 230 to provide electronic bill presentment and payment services.

The third way of delivering billing information to customers and receiving payment instructions from customers is via an internet banking portal operated by or on behalf of a financial institution for which the open EPP integrator 230 provides electronic bill presentment and payment services. In this situation, a third customer 252 logs onto an internet banking portal 254, which is connected to the open EPP integrator 230 to allow the open EPP integrator 230 to provide electronic bill presentment and payment services.

The fourth way of delivering billing information to customers and receiving payment instructions from customers is via an internet banking portal hosted by same service provider as the open EPP integrator 230 on behalf of a financial institution for which the open EPP integrator 230 also provides electronic bill presentment and payment services. In this situation, a fourth customer 256 logs onto an internet banking portal included within and hosted by the open EPP integrator 230, which internet banking portal includes the electronic bill presentment and payment services also provided by the open EPP integrator 230.

In addition to the four ways in which billing information is supplied by the open EPP integrator 230 to customers and billing instructions are received from these customers by the open EPP integrator 230 as described above, there are at least four additional ways involving third party customer service providers and/or consolidators in which billing information is supplied by the open EPP integrator 230 to customers, but wherein billing instructions provided by these customers may be executed by the third party customer service providers and/or consolidators instead of being routed to the EPP integrator 230 for implementation.

The first of these ways in which billing information is supplied by the open EPP integrator 230 to customers is via a third party customer service provider. In this situation, a fifth customer 258 obtains its bills from and initiates payment of its bills through a first customer service provider 260. The fifth customer 258 logs into the website provided by the first customer service provider 260 to obtain its bills, which may be obtained through the open EPP integrator 230 for any billers for which the open EPP integrator 230 has billing information. While the first customer service provider 260 may route payment of bills initiated by the fifth customer 258 through the open EPP integrator 230 for payment, such payment may instead be made through a payment provider (not shown herein) to which the first customer service provider 260 has a direct connection or a connection through a consolidator (not shown herein).

The second of these ways in which billing information is supplied by the open EPP integrator 230 to customers is via a third party portal and a third party customer service provider. In this situation, a sixth customer 262 obtains its bills from and initiates payment of its bills through a second portal 264, which is interposed between the sixth customer 262 and a second customer service provider 266. The second customer service provider 266 thus functions to provide electronic bill presentment and payment services for the second portal 264. The sixth customer 262 logs into the website provided by the second portal 264, and selects electronic bill presentment and payment, whereupon the bills of the sixth customer 262 (which may be obtained through the open EPP integrator 230 for any billers for which the open EPP integrator 230 has billing information) are provided by the second customer service provider 266. While the second customer service provider 266 may route payment of bills initiated by the sixth customer 262 via the second portal 264 through the open EPP integrator 230 for payment, such payment may instead be made through a payment provider (not shown herein) to which the second customer service provider 266 has a direct connection or a connection through a consolidator (not shown herein).

The third of these ways in which billing information is supplied by the open EPP integrator 230 to customers is via a third party customer service provider and a consolidator. In this situation, a seventh customer 268 obtains its bills from and initiates payment of its bills through a third customer service provider 270, which is in turn connected to the open EPP integrator 230 via a second consolidator 272. The fifth customer 258 logs into the website provided by the first customer service provider 260 to obtain its bills, which may be obtained through the open EPP integrator 230 for any billers for which the open EPP integrator 230 has billing information. While the third customer service provider 270 may route payment of bills initiated by the seventh customer 268 through the open EPP integrator 230 for payment via the second consolidator 272, such payment may instead be made through a payment provider (not shown herein) to which the first customer service provider 260 has a direct connection or a connection through the second consolidator 272.

The fourth of these ways in which billing information is supplied by the open EPP integrator 230 to customers is via a third party portal, a third party customer service provider, and a consolidator. In this situation, an eighth customer 274 obtains its bills from and initiates payment of its bills through a third portal 276, which is interposed between the eighth customer 274 and a fourth customer service provider 278, which is in turn connected to the open EPP integrator 230 via a third consolidator 280. The fourth customer service provider 278 thus functions to provide electronic bill presentment and payment services for the third portal 276. The eighth customer 274 logs into the website provided by the third portal 276, and selects electronic bill presentment and payment, whereupon the bills of the eighth customer 274 (which may be obtained through the open EPP integrator 230 for any billers for which the open EPP integrator 230 has billing information) are provided by the fourth customer service provider 278. While the fourth customer service provider 278 may route payment of bills initiated by the eighth customer 274 via the third portal 276 through the open EPP integrator 230 for payment via the third consolidator 280, such payment may instead be made through a payment provider (not shown herein) to which the fourth customer service provider 278 has a direct connection or a connection through the third consolidator 280.

The connection of the open EPP integrator 230 to financial institutions and payment providers to execute the payment instructions received from customers will be discussed next. There are three different ways in which payment may be accomplished, depending upon whether or not a biller, a biller service provider, or a customer service provider has specified (i.e., required) the use of a particular payment provider. If the use of a particular payment provider has not been specified, the open EPP integrator 230 will make the payment itself. This is accomplished either electronically, with the open EPP integrator 230 debiting the customer's account at a first customer's financial institution 282 and crediting the biller's account at a first biller's financial institution 284, or by mailing a payment, either check or draft, drawn on the customer's account to the order of the biller. This process is discussed in greater detail below.

If the biller has specified that its payment provider must be used in order to pay the biller's bills electronically, then the open EPP integrator 230 will forward the payment request to a biller payment provider 288, which makes the payment electronically by debiting the customer's account at a second customer's financial institution 290 and crediting the biller's account at a second biller's financial institution 292, or, alternately where electronic payment is not possible, in another manner as is conventional in the art. If the biller has not specified its payment provider, but a customer service provider has specified that its payment provider must be used in order for the customer to pay bills electronically, then the open EPP integrator 230 will forward the payment request to a customer payment provider 294, which makes the payment by debiting the customer's account at a second customer's financial institution 296 and crediting the biller's account at a second biller's financial institution 298, or, alternately where electronic payment is not possible, in another manner as is conventional in the art.

Figure 7:
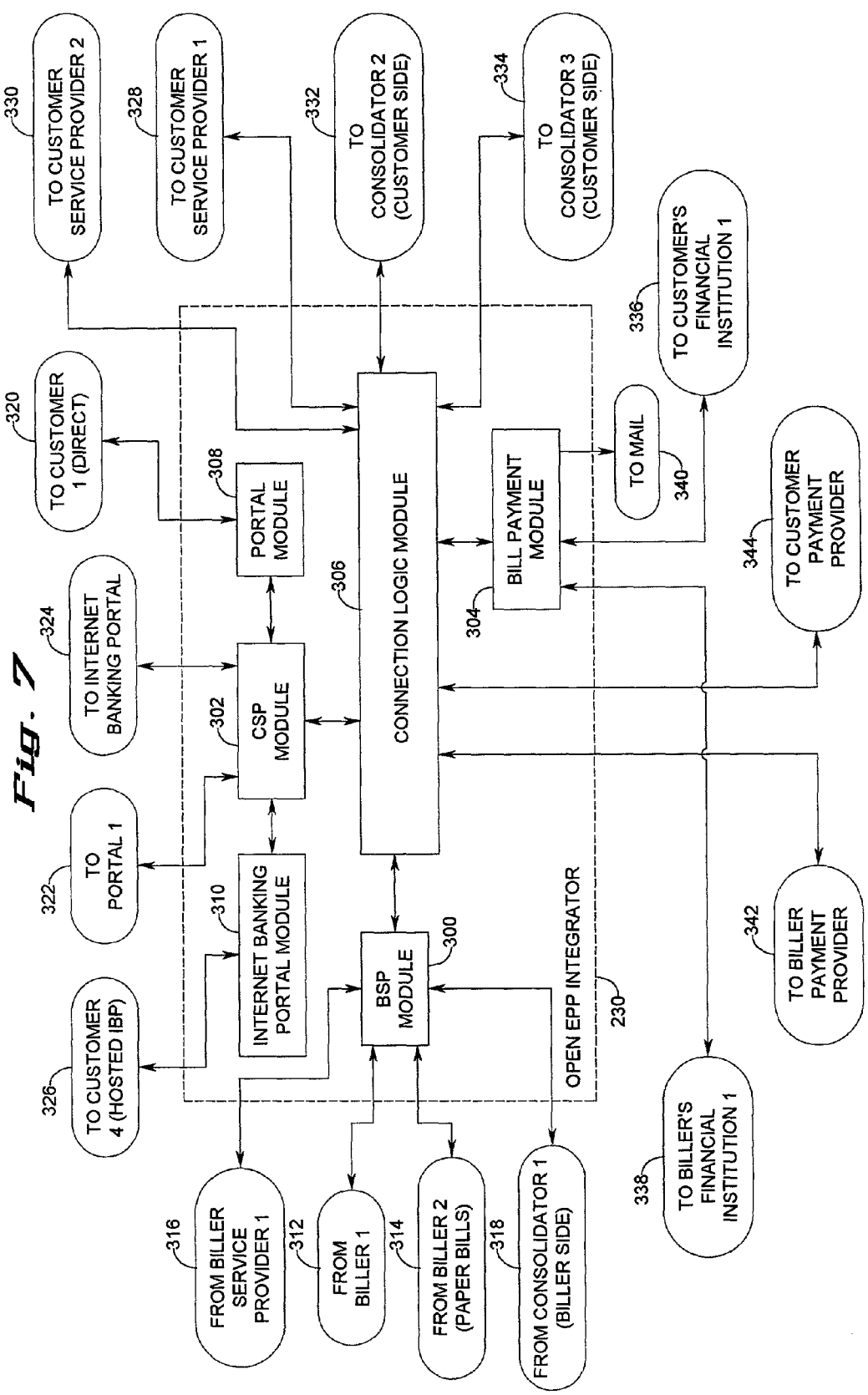
FIG. 7 is a functional schematic diagram of the open EPP integrator illustrated in FIG. 6, showing the various bill presentment and bill payment components included therein.

Referring now to FIG. 7, the various components of the open EPP integrator 230 and their interconnection both with each other and to the various components illustrated in FIG. 6 are shown in a schematic manner. There are four essential components within the open EPP integrator 230: a biller service provider (BSP) module 300, a customer service provider (CSP) module 302, a bill payment module 304, and a connection logic module 306. The biller service provider module 300, the customer service provider module 302, and the bill payment module 304 are each connected to the connection logic module 306, which integrates them and first serves to detect how much of the electronic bill presentment and payment service that the open EPP integrator 230 may provide in each instance, and then acts to initiate the provision of that service.

There are two additional components within the open EPP integrator 230 which are both portals which allow customers to directly interact with the open EPP integrator 230. A portal module 308 is used to provide a website onto which customers can log on to connect directly with the open EPP integrator 230. As such, the portal module 308 is a dedicated electronic bill presentment and payment portal. An Internet banking portal module 310 is used to host a website on behalf of a financial institution, with customers being able to log on perform various Internet banking functions, of which one is electronic bill presentment and payment.

Connectivity to the various modules in the open EPP integrator 230 parallels the connections illustrated in FIG. 6. A connection 312 from the first biller (for electronic bill data), a connection 314 from the second biller (for paper bill data), a connection 316 from the first biller service provider, and a connection 318 from the first consolidator are supplied to the biller service provider module 300.

A connection 320 to the first customer is supplied from the portal module 308, which is connected to the customer service provider module 302. A connection 322 to the first external portal and a connection 324 to the external internet banking portal are supplied from the customer service provider module 302. A connection 326 to the fourth customer is supplied from the Internet banking portal module 310, which is connected to the customer service provider module 302. All connections to customers which are made through external customer service providers or consolidators are made with the connection logic module 306. Accordingly, a connection 328 to the first customer service provider, a connection 330 to the second customer service provider, a connection 332 to the second consolidator, and a connection 334 to the third consolidator are made with the connection logic module 306.

A connection 336 to the first customer's financial institution, a connection 338 to the first billers financial institution, and a connection 340 to the mailing of paper payments are made with the bill payment module 304. It should be noted that in the event a customer wants to receive both an electronic bill and a paper bill, the customer may make this election and would then be sent both an electronic bill (via the connection 320) and a paper bill (via the connection 340). A connection 342 to the biller payment provider and a connection 344 to the customer payment provider are made with the connection logic module 306. Depending on the particular circumstances of each bill or payment, the connection logic module 306 will make the appropriate connections, as will be demonstrated below in several specific examples.

Targeted messaging may also be used in conjunction with the delivery of bills to customers. For example, targeted messaging may be delivered to customers through the inclusion of such messages and/or other content in either electronic bills or paper bills. Such messaging may be marketing material relating to the biller or its products or services, or, alternately, it may relate to another company whose products or services are being marketed through a tie-in to the biller sending the bill. It may be complete in and of itself, or it may consist at least in part of a web link to the biller's website (or to the tied-in company's website). In this regard, the integrated bill presentment and payment system of the present invention can also be used to distribute information other than bills, such as statements and other communications for customers.

FIGS. 8 through 12 are flow diagrams illustrating exemplary processes by which billing data from billers is converted into digital billing information and stored by the integrated bill presentment and payment system of the present invention. Referring first to FIG. 8, the process by which a biller directly connected to the integrated bill presentment and payment system is illustrated. Initially, the biller contracts with the service provider operating the integrated bill presentment and payment system of the present invention in a sign up step 350. Next, the biller's payment preferences (what type of payments the biller will accept, e.g., electronic transfers, checks, credit cards, etc.) are obtained and stored in a save biller payment preferences step 352.

Since in the situation contemplated by FIG. 8 where a biller is contracting with a service provider to perform the entire service, the service provider will be the default payment provider, and this payment provider information is saved in a save service as payment provider step 354. The biller will send billing data (which in the situation contemplated by FIG. 8 is digital data) on a monthly or other periodic basis, as documented by a biller sends billing data step 356. This billing data is converted into the format of a bill database which is operated by the service provider of the integrated bill presentment and payment system in a billing data conversion step 358. Finally, the converted billing data is stored in the bill database in a store billing data in database step 360.

Referring next to FIG. 9, the process by which a biller supplying billing data as paper bills to the integrated bill presentment and payment system is illustrated. Again, the biller initially contracts with the service provider operating the integrated bill presentment and payment system of the present invention in a sign up step 370. Next, the biller's payment preferences (what type of payments the biller will accept, e.g., electronic transfers, checks, credit cards, etc.) are obtained and stored in a save biller payment preferences step 372. Since in the situation contemplated by FIG. 9 where a biller is contracting with a service provider to perform the entire service, the service provider will be the default payment provider, and this payment provider information is saved in a save service as payment provider step 374.

The biller will send billing data (which in the situation contemplated by FIG. 9 is paper billing data) on a monthly or other periodic basis, as documented by a biller sends paper billing data step 376. The paper billing data is scanned, and the relevant billing data (as opposed to nonbilling information appearing on paper bills) is extracted by parsing the billing data in a scanning and parsing step 378. This parsed billing data is converted into the format of a bill database which is operated by the service provider of the integrated bill presentment and payment system in a billing data conversion step 380. Finally, the converted billing data is stored in the bill database in a store billing data in database step 382.

Figure 10:
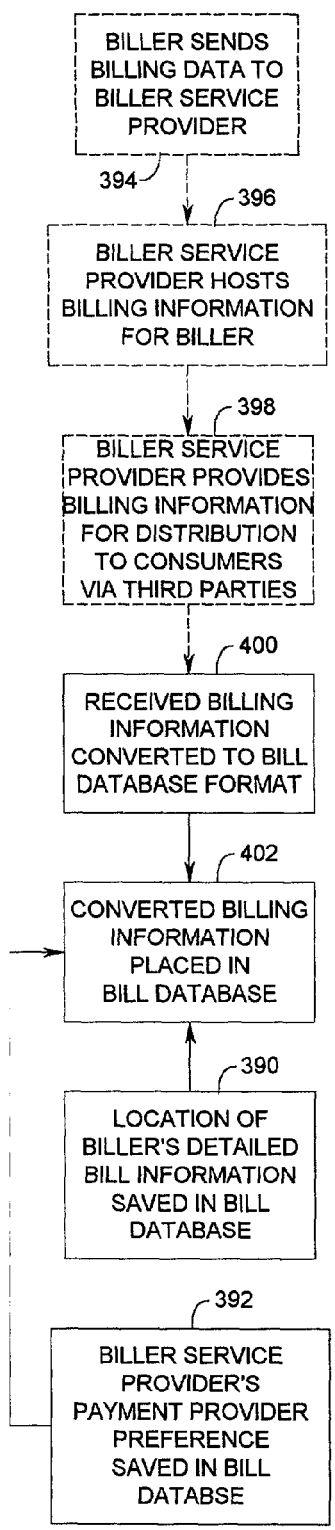
FIG. 10 is a flow diagram illustrating the process by which a biller interfaces with an independent biller service provider (shown in dotted lines) and with the service provider operating the integrated bill presentment and payment system of the present invention to obtain and save the biller's billing information in the integrated bill presentment and payment system's database.

Referring now to FIG. 10, the process by which billing information from a biller is obtained via a billing service provider is illustrated. In FIG. 10, steps which are not performed by the service provider of the integrated bill presentment and payment system are shown in dotted lines. The location (web address) of the biller's detailed billing information hosted by the third biller party service provider is stored in a save bill information location step 390. Since in the situation contemplated in FIG. 10 the biller is using the third party biller service provider to publish its billing information, a third party biller payment provider associated with the third party biller service provider will also presumably be used, obviating the need to obtain biller payment preferences. Information identifying the third party biller payment provider associated with the third party biller service provider is stored in a save biller payment provider information step 392.

The biller sends billing data to the third party biller service provider on a monthly or other periodic basis in a biller sends billing data step 394. The third party biller service provider processes the billing data and hosts billing information for the biller in a host billing information step 396. The third party biller service provider makes this billing information available to other parties which will broadcast the billing information to customers in a distribute billing information step 398. This billing information is obtained by the service provider of the integrated bill presentment and payment system, and converted to its billing database format in a billing data conversion step 400. Finally, the converted billing data is stored in the bill database in a store billing data in database step 402.

Figure 11:
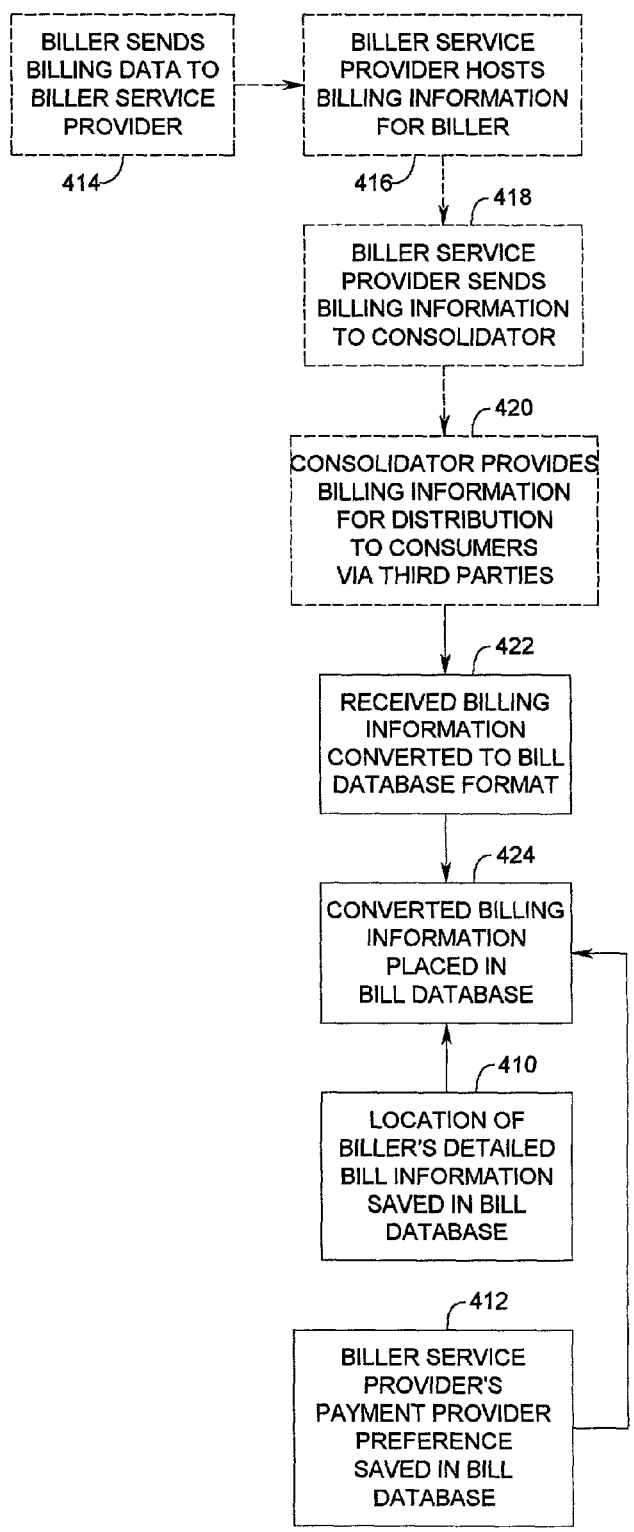
FIG. 11 is a flow diagram illustrating the process by which a biller interfaces with an independent biller service provider and a consolidator (both shown in dotted lines) and with the service provider operating the integrated bill presentment and payment system of the present invention to obtain and save the biller's billing information in the integrated bill presentment and payment system's database.

Referring next to FIG. 11, the process by which billing information from a biller is obtained from a billing service provider via a consolidator is illustrated. In FIG. 11, steps which are not performed by the service provider of the integrated bill presentment and payment system are shown in dotted lines. The location (web address) of the biller's detailed billing information hosted by the third party biller service provider is stored in a save bill information location step 410. Since in the situation contemplated in FIG. 11 the biller is using the third party biller service provider to publish its billing information, a third party biller payment provider associated with the third party biller service provider will also presumably be used, obviating the need to obtain biller payment preferences. Information identifying the third party biller payment provider associated with the third party biller service provider is stored in a save biller payment provider information step 412.

The biller sends billing data to the third party biller service provider on a monthly or other periodic basis in a biller sends billing data step 414. The third party biller service provider processes the billing data and hosts billing information for the biller in a host billing information step 416. The third party biller service provider provides this billing information to a third party consolidator in a send billing information to consolidator step 418. The third party consolidator then broadcasts the billing information to other third parties which will distribute it to customers in a distribute billing information step 420. This billing information is obtained by the service provider of the integrated bill presentment and payment system, and converted to its billing database format in a billing data conversion step 422. Finally, the converted billing data is stored in the bill database in a store billing data in database step 424.

Figure 12:
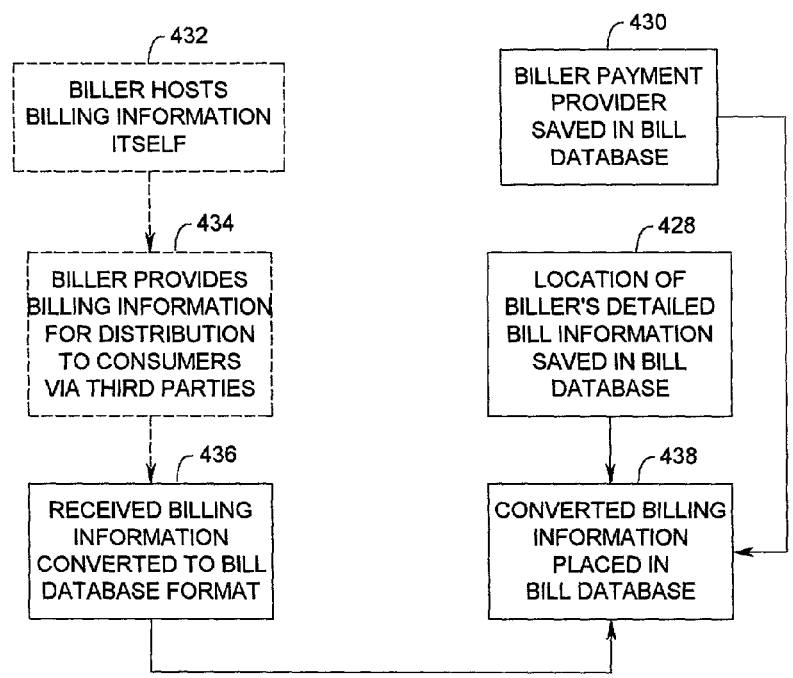
FIG. 12 is a flow diagram illustrating the process by which a biller hosting its own billing information (shown in dotted lines) interfaces with the service provider operating the integrated bill presentment and payment system of the present invention to obtain and save the biller's billing information in the integrated bill presentment and payment system's database.

Referring now to FIG. 12, the process by which billing information is obtained from a biller which is hosting its own bills is illustrated. In FIG. 12, steps which are not performed by the service provider of the integrated bill presentment and payment system are shown in dotted lines. The location (web address) of the biller's detailed billing information hosted by the biller is stored in a save bill information location step 428. Since in the situation contemplated in FIG. 12 the biller is publishing its own billing information, a third party biller payment provider associated with biller will presumably be used, obviating the need to obtain biller payment preferences. Information identifying the third party biller payment provider used by the biller is stored in a save biller payment provider information step 430.

The biller processes its billing data and hosts its billing information in a host billing information step 432. The biller makes this billing information available to other parties which will broadcast the billing information to customers in a distribute billing information step 434. This billing information is obtained by the service provider of the integrated bill presentment and payment system, and converted to its billing database format in a billing data conversion step 436. Finally, the converted billing data is stored in the bill database in a store billing data in database step 438.

Figure 14:
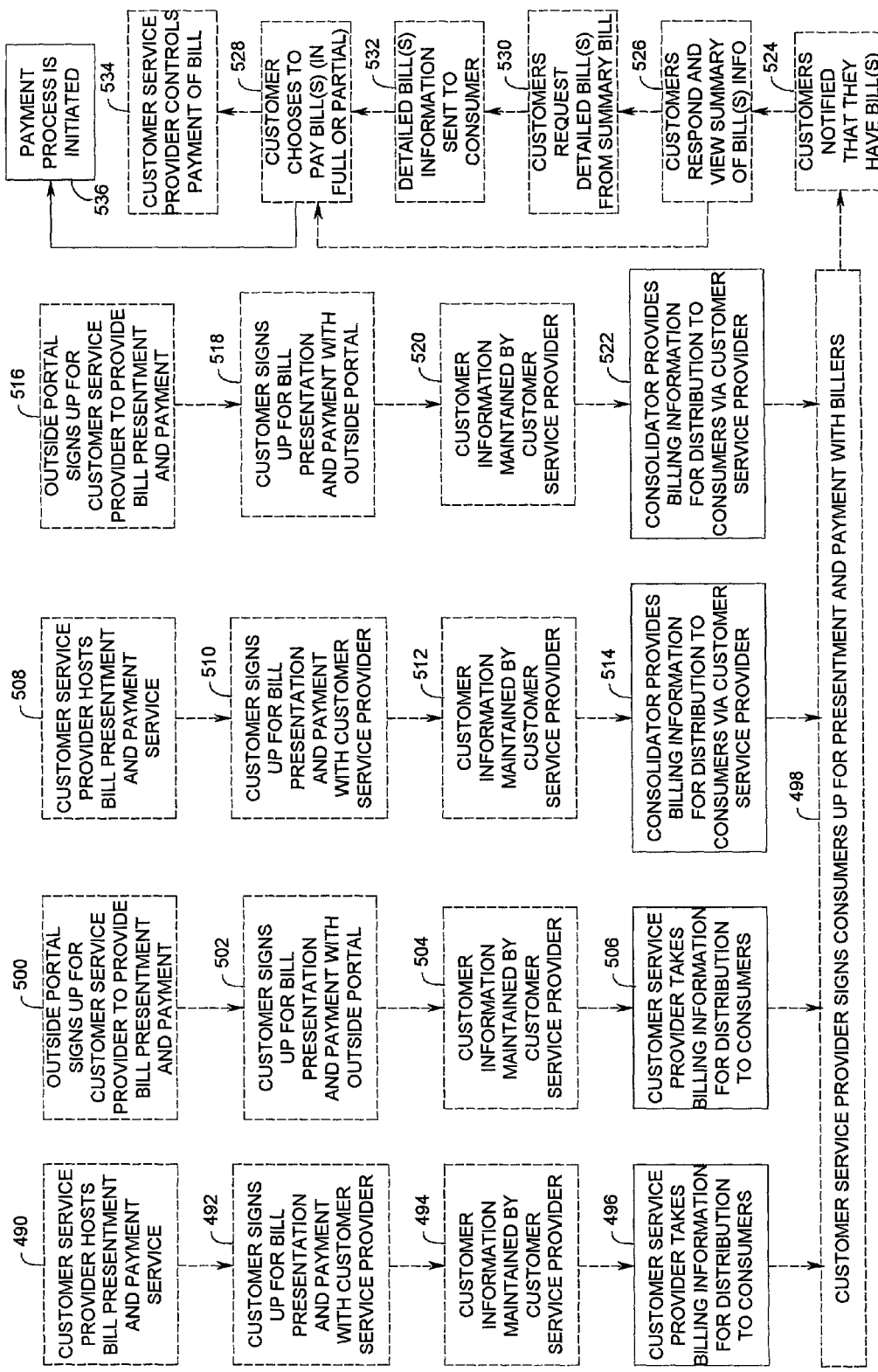
FIG. 14 is a flow diagram illustrating the process by which customers interfacing with the integrated bill presentment and payment system of the present invention through an independent customer service provider function sign up for bill presentment and payment, obtain bills, and initiate the payment of bills.

FIGS. 13 and 14 illustrate examples of the processes by which customers sign up for electronic bill presentment and payment, are presented with bills, and initiate the payment of bills. The examples illustrated in FIG. 13 are all situations in which third party customer service providers and/or third party consolidators are not used, while the examples illustrated in FIG. 14 are all situations in which third party customer service providers and/or third party consolidators are used. Referring first to FIG. 13, examples of four differently situated customers are provided, with the discussion herein first focussing on these customers signing up for the service, and then on an example of the presentment and initiation of the payment of a bill. Note that the steps which are not performed by the service provider of the integrated bill presentment and payment system are again shown in dotted lines.

The first customer connects directly to the service provider of the integrated bill presentment and payment system. This is accomplished by using a portal hosted by the service provider of the integrated bill presentment and payment system in a host service on portal step 440. Customers logging into this portal can choose to sign up for electronic bill presentment and payment in a sign up for service step 442 by providing information about themselves (e.g., name, address, social security number, etc.) and their financial information (e.g., accounts which may be used to pay bills, credit card information, etc.), which information is placed into the service provider's customer database in a store customer information step 444.

The second customer connects with a third party portal for which the service provider of the integrated bill presentment and payment system provides electronic bill presentment and payment services. The operator of the third party portal initially signs up with the service provider of electronic bill presentment and payment for the service provider to provide the services in an outside portal sign up step 446. Customers logging into the third party portal can choose to sign up for electronic bill presentment and payment by providing information about themselves and their financial information in a customer sign up step 448. This information is provided to the service provider and is placed into the service provider's customer database in the store customer information step 444.

The third customer connects with an internet banking portal which is hosted by the service provider of the integrated bill presentment and payment system. The service provider of the integrated bill presentment and payment system hosts an internet banking portal for a financial institution in a host internet banking site step 450. Customers logging into the internet banking portal can select electronic bill presentment and payment and sign up for electronic bill presentment and payment in a sign up for service step 452, following which information about the customers and their financial information is placed into the service provider's customer database in the store customer information step 444.

The fourth customer connects with a third party internet banking portal for which the service provider of the integrated bill presentment and payment system provides electronic bill presentment and payment services. The operator of the third party portal initially signs up with the service provider of electronic bill presentment and payment for the service provider to provide the services in an outside portal sign up step 454. Customers logging into the internet banking portal can choose to sign up for electronic bill presentment and payment in a sign up for service step 456, following which information about the customers and their financial information is placed into the service provider's customer database in the store customer information step 444.

A brief example of the presentment and payment of bills may also de described in conjunction with FIG. 13. Following enrollment in the store customer information step 444, customers are notified of which bills the integrated bill presentment and payment system of the present invention can present to them for payment in a customer bill option notification step 460 (this notification can also occur periodically after enrollment, particularly to announce the availability of new bills which may be presented by the integrated bill presentment and payment system. Upon such notification, customers will select those bills which they wish to receive electronically in a select bills to be received step 462. Billers which are selected by customers in the select bills to be received step 462 are notified of this selection in a notify billers of enrollment step 464. The billers then have the opportunity to approve or deny the requests for electronic bill presentment and payment in a billers approval or denial step 466, and this approval or denial is communicated to customers in a notification of approval or denial step 468.

At this point, the actual electronic bill presentment and payment process begins. The first step is to notify customers when they have bills in a notify customers of bills step 470, and in the preferred embodiment this is accomplished by sending the customers e-mails to indicate that they have bills. It should be noted that instead of using e-mails, instant messaging or any other form of electronic notification (including telephone or pager notification) could instead be used. This can be done in one of several different ways, such as for example a single daily e-mail with all bills received for the customer on that day, separate e-mails for each bill received for the customer which are sent immediately upon receipt, etc. E-mails may also be used to remind customers of unpaid bills which are approaching their due date if so desired. The e-mails will in the preferred embodiment contain a web link which the customer can click on to immediately be taken to a summary of the bill or bills in a view summary of bills step 472, which will typically show at least the name of the biller, the account number, the amount billed, and a due date. The bill(s) shown in this step can include only the bill or bills identified in the notification, or they can include all recent or unpaid bills which the customer has as well.

Upon viewing the summary information, the customers have an option to either pay the bill or bills from the summary screen, or to obtain further detail about the bills. It the choice is to pay the bill or bills from the summary information, they can do so in an initiate the payment of bills step 474, which allows they to pay all or part of each bill. If, on the other hand, the customers choose to view detailed information, they click on the option to see the detailed information for a particular bill in a request detailed information step 476. That detailed billing information is provided to the consumers in a send detailed information step 478, from which the consumers can order the payment of all or part of the billed amount in the initiate the payment of bills step 474. For multiple bills, these steps can be repeated to view detailed information about each of the bills if desired. Upon the decision of the consumers to pay bills in the initiate the payment of bills step 474, the process moves to a payment initiation step 480.

Referring next to FIG. 14, examples of situations in which third party customer service providers and/or third party consolidators are used are illustrated, with examples of four differently situated customers being provided, with the discussion herein again first focussing on these customers signing up for the service, and then on an example of the presentment and initiation of the payment of a bill. Note that the steps which are not performed by the service provider of the integrated bill presentment and payment system are again shown in dotted lines, and, indeed, that in FIG. 14, most of the steps are performed by such third parties rather than the service provider of the integrated bill presentment and payment system. The participation of the service provider is to facilitate the provision of billing information through third party customer service providers and/or third party consolidators, and/or to assist in the payment of bills if third party customer service providers do not have an associated customer payment provider.

The fifth customer accesses bill presentment and payment services through a third party customer service provider, which hosts these services in a host bill presentment and payment step 490. Customers can choose to sign up for electronic bill presentment and payment in a sign up for service step 492 by providing information about themselves (e.g., name, address, social security number, etc.) and their financial information (e.g., accounts which may be used to pay bills, credit card information, etc.), which information is maintained by the customer service provider in a maintain customer information step 494. The customer service provider obtains billing information from the service provider of the integrated bill presentment and payment system of the present invention in an obtain billing information step 496, and signs up consumers connected to its service for presentation and payment of bills in a sign up step 498 which would be performed in a manner similar to the manner described above in conjunction with steps 460, 462, 464, 466, and 468.

The sixth customer accesses bill presentment and payment services through an outside portal, which portal signs up to obtain these services from a third party customer service provider in a portal signs up for services step 500. Customers can choose to sign up for electronic bill presentment and payment in a sign up for service step 502 by providing information about themselves (e.g., name, address, social security number, etc.) and their financial information (e.g., accounts which may be used to pay bills, credit card information, etc.), which information is maintained by the customer service provider in a maintain customer information step 504. The customer service provider obtains billing information from the service provider of the integrated bill presentment and payment system of the present invention in an obtain billing information step 506, and signs up consumers connected to its service for presentation and payment of bills in the sign up step 498.

The seventh customer accesses bill presentment and payment services through a third party customer service provider and a consolidator, with the third party customer service provider hosting these services in a host bill presentment and payment step 508. Customers can choose to sign up for electronic bill presentment and payment in a sign up for service step 510 by providing information about themselves (e.g., name, address, social security number, etc.) and their financial information (e.g., accounts which may be used to pay bills, credit card information, etc.), which information is maintained by the customer service provider in a maintain customer information step 512. The customer service provider obtains billing information from the service provider of the integrated bill presentment and payment system of the present invention via a consolidator in an obtain billing information step 514, and signs up consumers connected to its service for presentation and payment of bills in a sign up step 498.

The eighth customer accesses bill presentment and payment services through an outside portal, which portal signs up to obtain these services from a third party customer service provider in a portal signs up for services step 516. Customers can choose to sign up for electronic bill presentment and payment in a sign up for service step 518 by providing information about themselves (e.g., name, address, social security number, etc.) and their financial information (e.g., accounts which may be used to pay bills, credit card information, etc.), which information is maintained by the customer service provider in a maintain customer information step 520. The customer service provider obtains billing information from the service provider of the integrated bill presentment and payment system of the present invention via a consolidator in an obtain billing information step 522, and signs up consumers connected to its service for presentation and payment of bills in the sign up step 498.

The bill presentment and payment process parallels the process described above in conjunction with FIG. 13, except that the steps are not performed by the service provider of the integrated bill presentment and payment system. Customers are notified when they have bills in a notify customers of bills step 524, again typically by sending the customers e-mails. The e-mails contain a web link which the customer can click on to immediately be taken to a summary of the bill or bills in a view summary of bills step 526.

Upon viewing the summary information, if the customers choose to pay the bill or bills from the summary information, they can do so in an initiate the payment of bills step 528. If, on the other hand, the customers choose to view detailed information, they may make that choice and request the detailed information in a request detailed information step 530. That detailed billing information is provided to the consumers in a send detailed information step 532, from which the consumers can order the payment of all or part of the billed amount in the initiate the payment of bills step 528. Upon the decision of the consumers to pay bills in the initiate the payment of bills step 528, the process moves either to a customer service provider payment step in which the third party customer service provider will arrange payment of the bill, or, alternatively, to a payment initiation step 536 in which the service provider of the integrated bill presentment and payment system of the present invention will have the opportunity to arrange form payment of the bills on behalf of the consumers.

Figure 15:
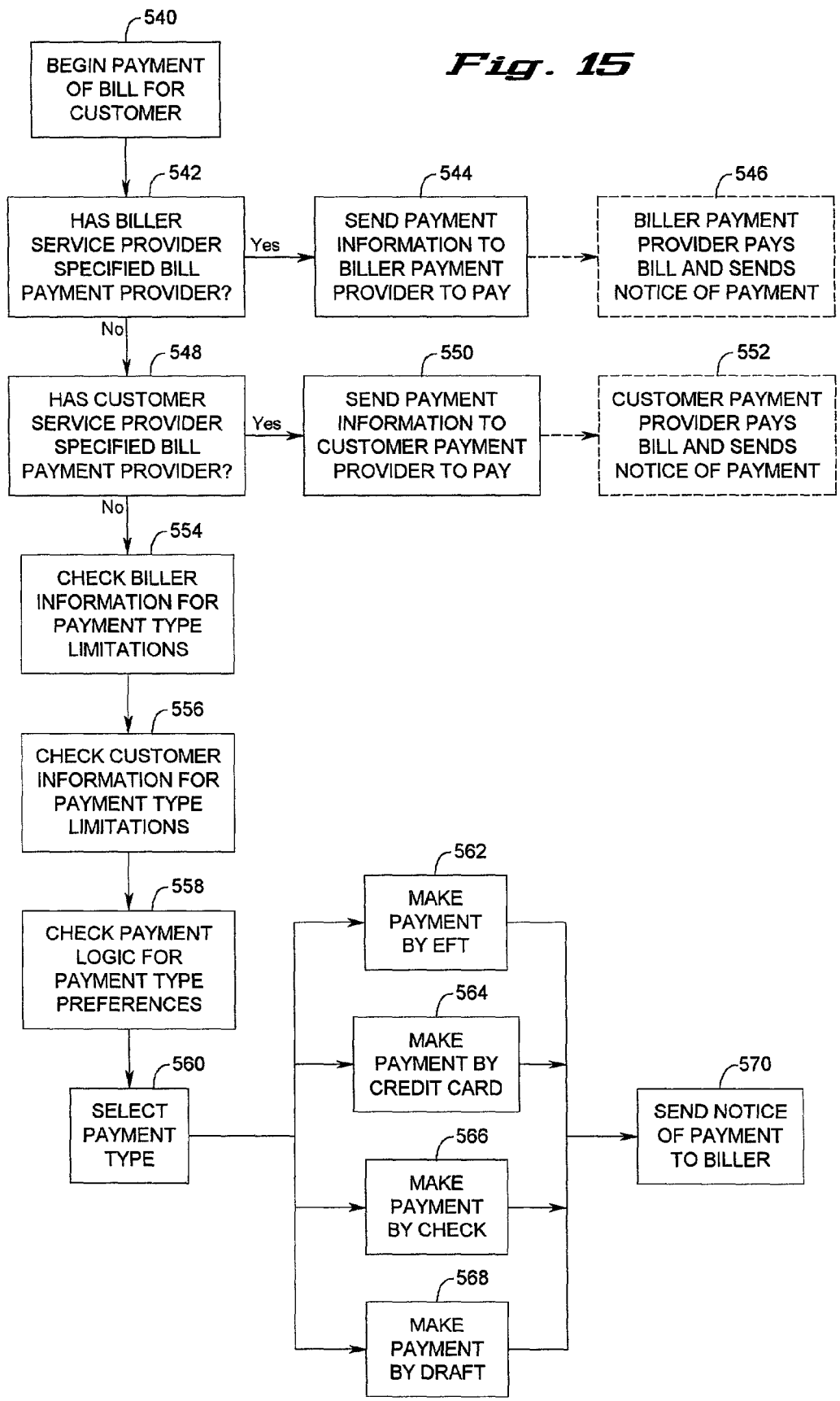
FIG. 15 is a flow diagram illustrating the process by which bills designated for payment by customers initiating bill payment by using the integrated bill presentment and payment system of the present invention are paid.

Moving next to FIG. 15, the operation of the integrated bill presentment and payment system of the present invention to pay bills for which payment has been initiated by customers is illustrated. The operation begins with a begin payment of bill step 540, and progresses to a determination of whether or not a biller service provider has specified a bill payment provider to be used as a payment processor in a biller payment provider inquiry step 542. If a biller payment provider has been specified, then payment information is sent to the biller payment provider in a send information to biller payment provider step 544. In this case, the biller payment provider would then handle the payment and inform the biller that payment has been made in a biller payment provider payment step 546.

If, on the other hand, a biller payment provider has not been specified, the process instead moves to a determination of whether or not a customer service provider has specified a bill payment provider to be used as a payment processor in a customer payment provider inquiry step 548. If a customer payment provider has been specified, then payment information is sent to the customer payment provider in a send information to customer payment provider step 550. In this case, the customer payment provider would then handle the payment and inform the biller that payment has been made in a customer payment provider payment step 552.

If, on the other hand, a customer payment provider has not been specified, the process instead moves to a check of stored biller information to determine what types of payment the biller will accept in a check biller payment limitations step 554. This creates a group of payment types which can be considered for use in making the payment initiated by the customer. Next, a check of stored customer information is performed in a check customer payment limitations step 556 in order to determine what payment types can be used in making payments on behalf of the particular customer (or, alternately, the customer may affirmatively select a particular mode of payment on a bill-by-bill basis). This further limits the group of payment types acceptable to the biller From the remaining payment types, a check for preference of payment type among the remaining payment type options is made in a check payment preference step 558, and a single payment type is selected in a select payment type step 560. This selection may be based upon risk factors or the relative cost of making payments. Examples of typical payment types which can be made are illustrated as an EFT (electronic funds transfer)/debit card payment step 562, a credit card payment step 564, a check payment step 566, and a draft payment step 568. One of these types of payment is made by the service provider of the integrated bill presentment and payment system according to the selection made in the select payment type step 560. Following this, the service provider may send a notice that the payment has been made to the biller in a send notice of payment step 570.

Figure 16:
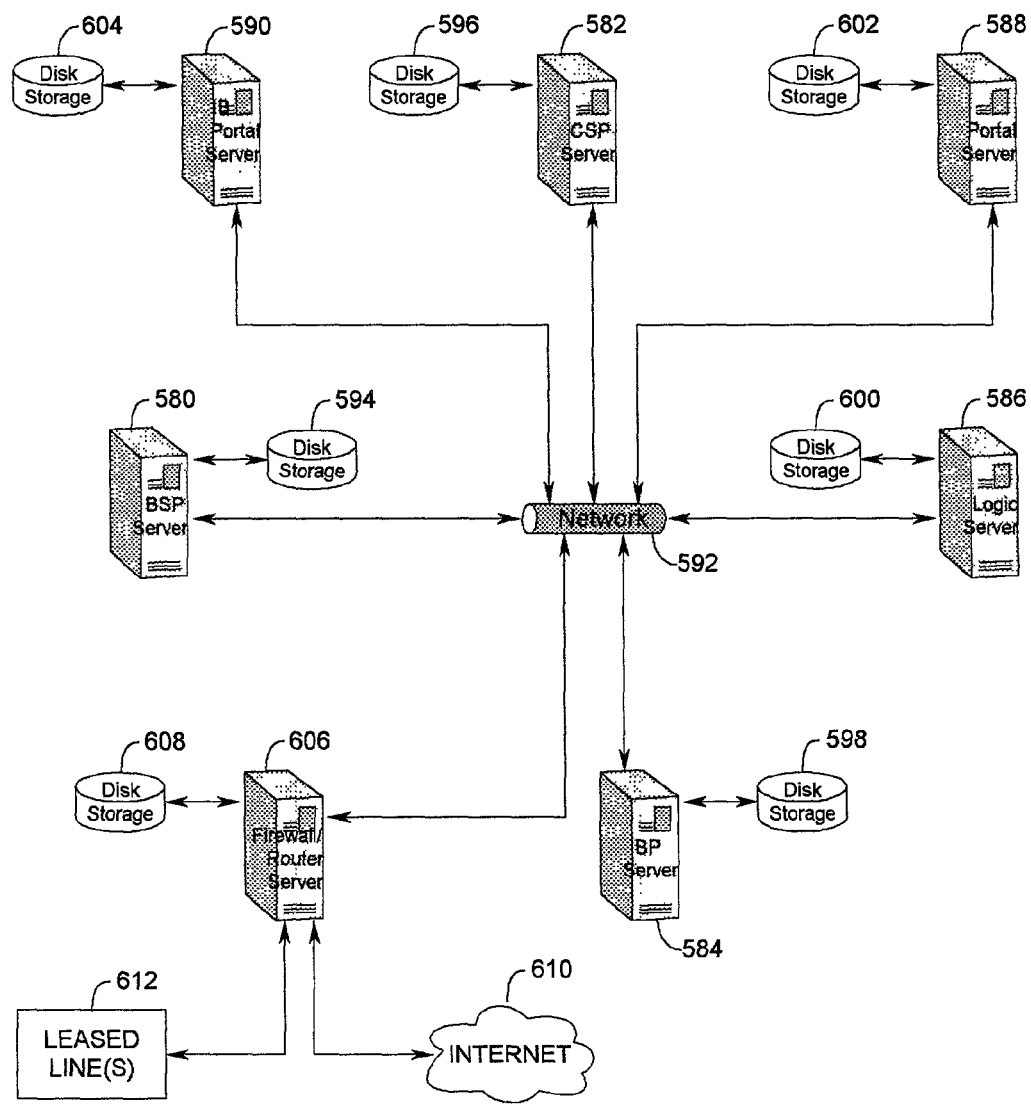
FIG. 16 is a functional schematic diagram of a first implementation of the integrated bill presentment and payment system of the present invention which is implemented using a plurality of servers, each of which servers perform a dedicated function in the system.

Turing next to FIG. 16, and with reference to FIG. 7, an exemplary depiction of one possible hardware implementation of the integrated bill presentment and payment system of the present invention which uses discrete servers for each function is illustrated. A BSP server 580 is used to provide the function of the biller service provider module 300, a CSP server 582 is used to provide the function of the customer service provider module 302, a BP server 584 is used to provide the function of the bill payment module 304, a logic server 586 is used to provide the function of the connection logic module 306, a portal server 588 is used to provide the function of the portal module 308, and an IB portal server 590 is used to provide the function of the Internet banking portal module 310. All six of the servers 580, 582, 584, 586, 588, and 590 are linked together by a network connection 592.

Each of the servers 580, 582, 584, 586, 588, and 590 is connected to a disk storage device, as designated by the reference numbers 594, 596, 598, 600, 602, and 604, respectively. A firewall/router server 606 having a disk storage device 608 connected thereto is also connected to the network connection 592. The firewall/router server 606 is connected to one or more leased lines 612, which may link the integrated bill presentment and payment system of the present invention with various billers, biller service providers, customer service providers, consolidators, and payment providers (none of which are shown in FIG. 16). The firewall/router server 606 is also connected to the Internet 610, through which the integrated bill presentment and payment system of the present invention may be connected to customers (the Internet 610 may also be a connection medium for one or more of the third parties described above as being connected through leased lines 612).

Figure 17:
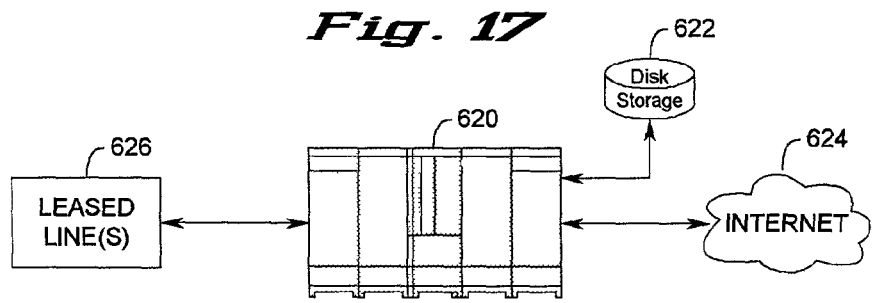
FIG. 17 is a functional schematic diagram of an alternate implementation of the integrated bill presentment and payment system of the present invention which is implemented using a single computer instead of the discrete servers used in the first implementation illustrated in FIG. 15.

Moving finally to FIG. 17, another exemplary depiction of a possible hardware implementation of the integrated bill presentment and payment system of the present invention which uses a single computer 620 for all functions is illustrated. The computer 620 is connected to a disc storage device 622, to one or more leased lines 612, and to the Internet 624. The computer 620 thus performs the functions of all seven of the servers 580, 582, 584, 586, 588, 590, and 606 illustrated in FIG. 16, and may itself be a mainframe, for example. Alternately, the functions of one or more of the servers 580, 582, 584, 586, 588, 590, and 606 may be implemented on a single server (not shown), and/or the functions of any of the servers 580, 582, 584, 586, 588, 590, and 606 may be implemented on more than one server (also not shown).

In another embellishment, the integrated bill presentment and payment system of the present invention may be provided by a service provider for one or more institutions each having a plurality of businesses as clients. In this event, the integrated bill presentment and payment system of the present invention would be operated by the service provider and branded with the name of institutions for which the service provider was providing the bill management service. For example, consider the situation where the third party provider operates the integrated bill presentment and payment system on behalf of one or more banks, which in turn market the service to their clients.

In this regard, if the integrated bill presentment and payment system is being provided as a branded product on behalf of one or more banks, a natural extension would be the provision of screen flow hooks into an on-line banking system. Such a system would move seamlessly between the two (or more) applications, without the necessity to have passwords entered to log onto the other secure system after the initial logon to the bank's secure website, or to one of the parts thereof. This feature may be referred to as seamless login, and includes seamless enrollment to all the other systems once the user has enrolled in any one of the systems.

It may therefore be appreciated from the above detailed description of the preferred embodiment of the present invention that it teaches an integrated, end-to-end bill presentment and payment system which interfaces with both billers and customers to electronically present bills to the customers and to allow the customers to electronically pay the bills. As such, the integrated bill presentment and payment system presents all of the advantages of a biller service provider in its interface with billers, as well as all of the advantages of a customer service provider in its interface with customers. The integrated bill presentment and payment system is capable of accepting billing information electronically, in paper form, or as a print stream. Its bill payment capability is sufficiently sophisticated so as to pay bills using the limitations of what forms of payment billers will accept, the forms of payment which may be made on behalf of customers, costs of various payment methods, and risk-limiting strategies which are built into the integrated bill presentment and payment system.

As an end-to-end bill system, the integrated bill presentment and payment system of the present invention eliminates the need for consolidators; however, it is capable of interfacing with them to handle as much of an alternative linkage between billers and customers as it is allowed to. As such, the integrated bill presentment and payment system of the present invention is capable of accepting billing information from billers hosting their own billing information, from billing service providers having captive billers, and from consolidators routing and distributing bills from billing service providers which the integrated bill presentment and payment system does not have other access to. In addition, the integrated bill presentment and payment system is capable of providing billing information to, and receiving payment instructions from, customer service providers having captive customers and consolidators dealing with such customer service providers.

The integrated bill presentment and payment system of the present invention operates in a manner which is both secure and effective, and it requires little effort on the part of consumers to sign up for it or to use it to view and pay bills. The integrated bill presentment and payment system of the present invention is also economically efficient by virtue of its end-to-end design to minimize its cost and thereby afford it the broadest possible market. Finally, all of the aforesaid advantages and objectives of the integrated bill presentment and payment system of the present invention are achieved without incurring any substantial relative disadvantage.

Although an exemplary embodiment of the integrated bill presentment and payment system of the present invention has been shown and described with reference to particular embodiments and applications thereof, it will be apparent to those having ordinary skill in the art that a number of changes, modifications, or alterations to the invention as described herein may be made, none of which depart from the spirit or scope of the integrated bill presentment and payment system of the present invention. All such changes, modifications, and alterations should therefore be seen as being within the scope of the present invention.

What is claimed is:

1. An integrated system for the presentation and payment of bills, comprising:
   at least one processor; and
   a memory coupled to the at least one processor and storing:
      a first module which, when executed by the processor, receives billing information from billers, from biller service providers, and from biller-side consolidators;
      a second module which, when executed by the processor, sends billing information to customers, to customer service providers, and to customer-side consolidators, wherein said second module is also capable of receiving payment instructions from customers, from customer service providers, and from customer-side consolidators;
      a third module which, when executed by the processor, initiates payment in response to payment instructions received from customers, from customer service providers, and from customer-side consolidators, the third module configured to select a payment type based on payment type preference criteria maintained by the system; and
      a connection logic module which interconnects said first, second, and third modules and facilitates communication therebetween, the connection logic module configured to, when executed by the processor, detect the extent of electronic bill presentment and payment service to be provided by each of the first, second, and third module and to initiate that provision of service of each module, and to:
         receive a request from a customer to pay a biller;
         determine whether the bill should be paid through a biller payment provider or a customer payment provider; and
         if the bill is not determined to be paid through the biller payment provider or the customer payment provider, initiate paying the biller using the selected payment type.

2. An integrated system as defined in claim 1, wherein said system is capable of receiving both digital billing data and paper bills.

3. An integrated system as defined in claim 2, wherein the first module, when executed by the processor, converts said digital billing data into a desired format.

4. An integrated system as defined in claim 2, wherein the connection logic module, when executed by the processor, scans paper bills, extracts billing information from the scanned data, and places the extracted information in a desired format.

5. An integrated system as defined in claim 1, wherein said first module, when executed by the processor, accepts billing information from any biller which will provide billing information to third parties.

6. An integrated system as defined in claim 1, wherein said first module, when executed by the processor, accepts billing information from any biller service provider which will provide billing information to third parties.

7. An integrated system as defined in claim 1, wherein said first module, when executed by the processor, obtains billing information from billers, biller service providers, and/or biller-side consolidators by screen scraping.

8. An integrated system as defined in claim 1, wherein said first module accepts billing information from any consolidator which will provide billing information to third parties.

9. An integrated system as defined in claim 1, wherein said billing information received from a biller, biller service provider, or biller-side consolidator includes summary information only, with detailed information being retained by the biller, biller service provider, or biller-side consolidator, respectively.

10. An integrated system as defined in claim 9, wherein the billing information sent to a customer, customer service provider, or customer-side consolidator includes summary information plus information enabling the customer, customer service provider, or customer-side consolidator, respectively, to obtain detailed billing information.

11. An integrated system as defined in claim 10, wherein said information enabling the customer, customer service provider, or customer-side consolidator, respectively, to obtain detailed billing information comprises a web link.

12. An integrated system as defined in claim 1, wherein said billing information received from a biller, biller service provider, or biller-side consolidator includes both summary and detailed information.

13. An integrated system as defined in claim 1, wherein said second module, when executed by the processor, sends both electronic bills and paper bills.

14. An integrated system as defined in claim 13, wherein said second module, when executed by the processor, sends both electronic bills and paper bills to selected customers who desire to receive both electronic bills and paper bills.

15. An integrated system as defined in claim 14, wherein he system prints said paper bills for mailing to customers.

16. An integrated system as defined in claim 1, wherein said second module, when executed by the processor, sends electronic billing information to customers.

17. An integrated system as defined in claim 16, wherein said electronic information sent to a customer comprises an electronic bill notice indicating that a bill for that customer has been received.

18. An integrated system as defined in claim 17, wherein said electronic bill notice comprises an e-mail indicating that a bill for that customer has been received.

19. An integrated system as defined in claim 17, wherein said electronic bill notice comprises an instant message indicating that a bill for that customer has been received.

20. An integrated system as defined in claim 17, wherein said electronic bill notice can indicate that a plurality of bills for that customer have been received.

21. An integrated system as defined in claim 17, wherein said electronic bill notice includes detailed billing information.

22. An integrated system as defined in claim 17, wherein said electronic bill notice includes summary information relating to the bill.

23. An integrated system as defined in claim 22, wherein said electronic bill notice includes information enabling the customer to obtain detailed billing information.

24. An integrated system as defined in claim 23, wherein said information enabling the customer to obtain billing information comprises a web link.

25. An integrated system as defined in claim 24, wherein said web link is directed to retrieve detailed billing information from said second module.

26. An integrated system as defined in claim 23, wherein said web link is directed to retrieve detailed billing information from said first module.

27. An integrated system as defined in claim 24, wherein said web link is directed to retrieve detailed billing information from the source of the billing information to said first module.

28. An integrated system as defined in claim 17, wherein said electronic bill notice includes information enabling the customer to obtain billing information.

29. An integrated system as defined in claim 28, wherein said information enabling the customer to obtain billing information comprises a web link.

30. An integrated system as defined in claim 29, wherein actuation of said web link enables the customer to obtain summary billing information.

31. An integrated system as defined in claim 30, wherein said web link is directed to retrieve summary billing information from said second module.

32. An integrated system as defined in claim 30, wherein said web link is directed to retrieve summary billing information from said first module.

33. An integrated system as defined in claim 30, wherein said web link is directed to retrieve summary billing information from the source of the billing information to said first module.

34. An integrated system as defined in claim 30, wherein actuation of said web link also enables the customer to obtain information enabling the customer to obtain detailed billing information.

35. An integrated system as defined in claim 34, wherein said information enabling the customer to obtain detailed billing information comprises a second web link.

36. An integrated system as defined in claim 35, wherein said second web link is directed to retrieve detailed billing information from said second module.

37. An integrated system as defined in claim 35, wherein said second web link is directed to retrieve detailed billing information from said first module.

38. An integrated system as defined in claim 35, wherein said second web link is directed to retrieve detailed billing information from the source of the billing information to said first module.

39. An integrated system as defined in claim 17, wherein said electronic information sent to a customer further comprises a reminder electronic bill notice that a bill for that customer has been received or is due in the near future.

40. An integrated system as defined in claim 39, wherein said reminder electronic bill notice comprises an email indicating that a bill for that customer has been received.

41. An integrated system as defined in claim 1, wherein payment instructions are forwarded by said system to a biller, a biller service provider, or a biller-side consolidator in accordance with a pre-existing agreement with the biller, the biller service provider, or the biller-side consolidator, respectively, to forward payment instructions to the biller, the biller service provider, or the biller-side consolidator, respectively, for processing.

42. An integrated system as defined in claim 1, wherein said payment type preference criteria are based at least in part upon payment type limitations provided by the biller associated with the bill for which payment is to be made.

43. An integrated system as defined in claim 1, wherein said payment type preference criteria are also based upon payment type limitations provided by the customer paying the bill.

44. An integrated system as defined in claim 1, wherein said payment type preference criteria are also based upon payment type preferences selected by said system.

45. An integrated system as defined in claim 1, wherein said third module, when executed by the processor, makes both electronic payments and paper payments.

46. An integrated system as defined in claim 45, wherein the system prints said paper bills for mailing to billers.

47. An integrated system as defined in claim 45, wherein said electronic payments are initiated by said third module and executed by a payment processor which debits the appropriate customer's account and credits an account associated with the appropriate biller.

48. An integrated system as defined in claim 47, wherein said payment processor is a third party payment processor.

49. An integrated system as defined in claim 45, additionally comprising: a payment processing module, wherein said electronic payments are initiated by said third module and executed by said payment processing module which, when executed by the processor, debits the appropriate customer's account and credits the appropriate biller's account.

50. An integrated system as defined in claim 1, wherein said system functions at least in part as a service bureau for at least one institution having a plurality of businesses as clients, and wherein said institution has at least one other service in addition to the presentation and payment of bills of which at least one other service is provided electronically to its clients, and wherein using either of said services requires a secure logon procedure, and wherein said integrated system allows said clients to move from the presentation and payment of bills to said at least one other service and from said at least one other service to the presentation and payment of bills without requiring a second secure logon procedure.

51. An integrated system as defined in claim 1, wherein targeted messages are delivered to customers with billing information, said targeted messages relating either to the biller or to its products or services, or, alternately, to another company or to its products or services which are being marketed through a tie-in to the biller sending the billing information.

52. A system which facilitates the interconnection of mutually incompatible electronic bill presentment and payment system components, comprising:
   at least one processor; and
   a memory coupled to the at least one processor and storing:
      a biller-side module which, when executed by the processor, receives billing information from billers, biller service providers, and consolidators, said billing information being representative of discrete bills originating with a plurality of different billers;
      a customer-side module which, when executed by the processor, provides said billing information to customers, customer service providers, and consolidators, and receives payment information from customers, customer service providers, and consolidators, said payment information being in satisfaction of discrete bills originating with a plurality of different billers; and
      a payment module which, when executed by the processor, initiates the payment of at least some of the discrete bills originating with a plurality of different billers in response to said payment information, the payment module configured to select a payment type based on payment type preference criteria maintained by the system,
      with the biller-side module, the customer-side module and the payment module coupled to a connection logic module which, when executed by the processor:
         receives a request from a customer to pay a biller;
         determines whether the bill should be paid through a biller payment provider or a customer payment provider; and
         if the bill is not determined to be paid through the biller payment provider or the customer payment provider, initiate paying the biller using the selected payment type.

53. A computer program product, comprising:
   a non-transitory computer-readable medium comprising code storing:
      a first module which, when executed by a processor, receives billing information from billers, from biller service providers, and from biller-side consolidators;
      a second module which, when executed by the processor, sends billing information to customers, to customer service providers, and to customer-side consolidators, wherein said second module also receives payment instructions from customers, from customer service providers, and from customer-side consolidators;
      a third module which, when executed by the processor, initiates payment in response to payment instructions received from customers, from customer service providers, and from customer-side consolidators; and
      a connection logic module which interconnects said first, second, and third modules and facilitates communication therebetween, the connection logic module configured to, when executed by the processor, detect the extent of electronic bill presentment and payment service to be provided by each of the first, second, and third module and to initiate that provision of service of each module, and to:
         receive a request from a customer to pay a biller;
         determine whether the bill should be paid through a biller payment provider or a customer payment provider; and
         if the bill is not determined to be paid through the biller payment provider or the customer, payment provider, initiate paying the biller using the selected payment type.

54. A computer program product, comprising:
a non-transitory computer-readable medium comprising code storing:
   a biller-side module which, when executed by a processor, receives billing information from billers, biller service providers, and consolidators, said billing information being representative of discrete bills originating with a plurality of different billers;
   a customer-side module which, when executed by the processor, provides said billing information to customers, customer service providers, and consolidators, and receives payment information from customers, customer service providers, and consolidators, said payment information being in satisfaction of discrete bills originating with a plurality of different billers; and
   a payment module which, when executed by the processor, initiates the payment of at least some of the discrete bills originating with a plurality of different billers in response to said payment information,
   with the biller-side module, the customer-side module and the payment module coupled to a connection logic module which, when executed by the processor:
      receives a request from a customer to pay a biller;
      determines whether the bill should be paid through a biller payment provider or a customer payment provider; and
      if the bill is not determined to be paid through the biller payment provider or the customer payment provider, initiates paying the biller using the selected payment type.

* * * * *